(12) United States Patent
Madasamy et al.

(10) Patent No.: US 10,164,795 B1
(45) Date of Patent: Dec. 25, 2018

(54) FORMING A MULTI-DEVICE LAYER 2 SWITCHED FABRIC USING INTERNET PROTOCOL (IP)-ROUTER / SWITCHED NETWORKS

(71) Applicant: Juniper Networks, Inc., Sunnyvale, CA (US)

(72) Inventors: Siva Madasamy, San Jose, CA (US); Yafan An, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/193,422

(22) Filed: Feb. 28, 2014

(51) Int. Cl.
*H04L 12/46* (2006.01)
*H04L 12/741* (2013.01)

(52) U.S. Cl.
CPC .......... *H04L 12/4641* (2013.01); *H04L 45/74* (2013.01)

(58) Field of Classification Search
CPC ...... H04L 12/46; H04L 12/4641; H04L 45/74
See application file for complete search history.

(56) References Cited

U.S. PATENT DOCUMENTS

| | | | |
|---|---|---|---|
| 8,798,055 B1* | 8/2014 | An | 370/390 |
| 2003/0179742 A1* | 9/2003 | Ogier et al. | 370/351 |
| 2013/0332602 A1* | 12/2013 | Nakil | G06N 99/005 709/224 |
| 2014/0348006 A1* | 11/2014 | Jain | H04L 43/0811 370/245 |
| 2015/0016300 A1* | 1/2015 | Devireddy et al. | 370/254 |
| 2015/0124586 A1* | 5/2015 | Pani | H04L 12/18 370/219 |
| 2017/0005923 A1* | 1/2017 | Babakian | H04L 69/324 |
| 2017/0317919 A1* | 11/2017 | Fernando | H04L 45/16 |

OTHER PUBLICATIONS

Mahalingam et al., "VXLAN: A Framework for Overlaying Virtualized Layer 2 Networks over Layer 3 Networks", Aug. 22, 2012, Network Working Group, Interent Draft, 21 pages.*
Arista Networks, "VXLAN Bridges Virtual and Physical Networks to the Cloud", https://www.arista.com/assets/data/pdf/TechBulletins/VXLAN_Overview.pdf, Aug. 2012, 2 pgs.
Arista Networks, "VXLAN: Eliminating Cloud Boundaries with SDN", https://www.arista.com/assets/data/pdf/VMworld_Demo_Brief.pdf, Aug. 2012, 2 pgs.
Cisco, "Deploying the VXLAN Feature in Cisco Nexus 1000V Series Switches", http://www.cisco.com/c/en/us/products/collateral/switches/nexus-1000v-switch-vmware-vsphere/guide_c07-702975.pdf, May 2012,19 pgs.

* cited by examiner

*Primary Examiner* — Feben Haile
(74) *Attorney, Agent, or Firm* — Cooley LLP

(57) ABSTRACT

In some embodiments, a method includes defining, by a processor included in a first node, a virtual-extensible-local-area-network (VXLAN) tunnel between the first node included in a first layer-two network, and a second node included in a second layer-two network, the VXLAN tunnel traversing at least one node of a layer-three network. The method includes receiving, at the first node, a layer-two data unit that is sent from a third node included in the first layer-two network, to a fourth node included in the second layer-two network. The method includes encapsulating, at the first node, the layer-two data unit to define an encapsulated data unit that includes a VXLAN header. The method includes sending the encapsulated packet from the first node towards the fourth node via the VXLAN tunnel.

19 Claims, 17 Drawing Sheets

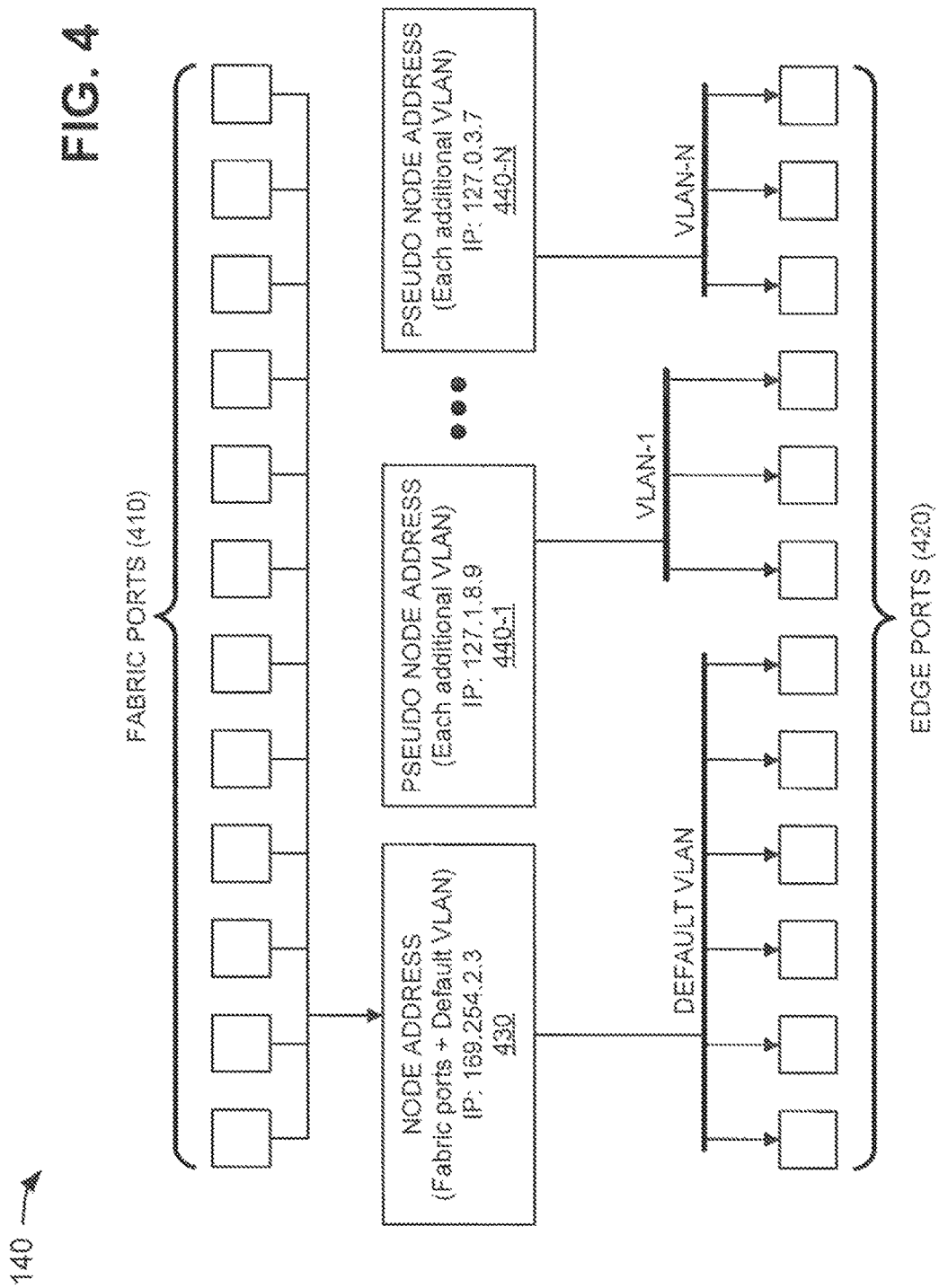

- 1310: RANDOMLY SELECT NODE IP ADDRESS FOR DEFAULT VLAN
- 1320: ADDITIONAL VLAN?
  - YES → 1330: RANDOMLY SELECT PSEUDO NODE IP ADDRESS FOR ADDITIONAL VLAN
  - NO ↓
- 1340: PROPAGATE NODE IP ADDRESS / PSEUDO NODE ADDRESS(ES) TO OTHER NODES IN AREA NETWORK
- 1350: CLASSIFY PORT AS FABRIC PORT WHEN PORT RECEIVES HELLO MESSAGE
- 1360: CLASSIFY PORT AS EDGE PORT WHEN PORT DOES NOT RECEIVE HELLO MESSAGE

FORMING A MULTI-DEVICE LAYER 2 SWITCHED FABRIC USING INTERNET PROTOCOL (IP)-ROUTER / SWITCHED NETWORKS

BACKGROUND

Bridging is a forwarding technique used in packet-switched computer networks. Unlike routing, bridging makes no assumptions about where in a network a particular address is located. Instead, bridging depends on flooding and examining source addresses in received packet headers to locate unknown devices. Once a device has been located, the device's location is recorded in a table where a media access control (MAC) address is stored so as to preclude the need for further broadcasting. Bridging generally refers to transparent bridging or a learning bridge operation which predominates in the Ethernet.

A network bridge connects multiple network segments at the data link layer (Layer 2) of the Open Systems Interconnection (OSI) model. In Ethernet networks, the term "bridge" refers to a device that behaves according to the IEEE 802.1d standard. The terms "switch" or "Layer 2 switch" are often used interchangeably with the term "bridge." Bridges are similar to repeaters or network hubs, which are devices that connect network segments at the physical layer (Layer 1) of the OSI model. However, with bridges, traffic from one network is managed rather than simply rebroadcast to adjacent network segments. A bridge can analyze incoming packets to determine if the bridge is able to send the given packet to another segment of the network.

However, network bridges are, by nature, typically not scalable due to the network bridges' extensive use of flooding (e.g., a scalability issue). Furthermore, network bridges typically force a single link connectivity that is prone to topology disturbances and is unable to use multiple shortest paths (e.g., a resiliency issue). Network bridges are also less able to support hi-sectional traffic, resulting in several half-utilized network segments (e.g., an efficiency issue). One attempt to solve such issues with network bridges involves using transparent interconnections of lots of links (referred to as TRILL). Another attempt to solve the issues with network bridges is referred to as shortest path bridging (SPB) pursuant to the IEEE 802.1aq standard. However, both TRILL and SPB involve implementation of new hardware in network devices, such as network bridges.

Network devices often include application specific integrated circuits (ASIC). While such ASICs are efficient implementing the application for which they were specifically designed, aspects of a specific ASIC type, e.g. an encapsulation method of an ASIC designed for a certain application, may not be compatible with a different ASIC type, e.g., a different encapsulation method of an ASIC designed for a different application. Accordingly, it may be difficult to scale unless the network devices have the same or compatible ASICs.

SUMMARY

In some embodiments, a method includes defining, by a processor included in a first node, a virtual-extensible-local-area-network (VXLAN) tunnel between the first node included in a first layer-two network, and a second node included in a second layer-two network, the VXLAN tunnel traversing at least one node of a layer-three network. The method includes receiving, at the first node, a layer-two data unit that is sent from a third node included in the first layer-two network, to a fourth node included in the second layer-two network. The method includes encapsulating, at the first node, the layer-two data unit to define an encapsulated data unit that includes a VXLAN header. The method includes sending the encapsulated packet from the first node towards the fourth node via the VXLAN tunnel.

In some embodiments, an apparatus includes a first network device configured to be included in a first layer-two network and configured to be operatively coupled, via a virtual-extensible-local-area-network (VXLAN) tunnel, to a second network device that is included in a second layer-two network. The first network device is configured receive an encapsulated data unit from the second network device via the first VXLAN tunnel. The first network device is configured to decapsulate the encapsulated data unit to define a decapsulated data unit. The first network device is configured to layer-two forward the decapsulated data unit to a third network device that is included in the first layer-two network.

In some embodiments, an apparatus includes a first network device configured to be included in a first layer-two network and configured to be operatively coupled to a second network device. The second network device is (1) included in the first layer-two network and (2) operatively coupled, via a virtual-extensible-local-area-network (VXLAN) tunnel, to a third network device that is included in a second layer-two network. The first network device is configured to receive, via the VXLAN tunnel, a data unit that was (1) encapsulated by the second network device prior to being layer-three routed between the third network device and the second network device and (2) decapsulated by the second network device.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 4 is a diagram of example functional components of the node depicted in FIG. 1;

FIG. 13 is a flow chart of an example process for propagating node IP addresses and for classifying ports according to an implementation described herein.

DETAILED DESCRIPTION

The following detailed description refers to the accompanying drawings. The same reference numbers in different drawings may identify the same or similar elements.

Systems and/or methods described herein may provide a virtual bridging architecture that enables multiple network devices (or nodes) to automatically form multiple shortest paths among the multiple nodes without loops. The multiple shortest paths may span across a variety of networks (e.g., legacy switched and routed networks) and may construct a virtual bridging domain that appears as a single network device. The systems and/or methods can use Ethernet over Internet protocol (IP)/generic routing encapsulation (GRE) tunnels at edge nodes to act as a forwarding plane between nodes, and can use a modified intermediate system to intermediate system (IS-IS) protocol to propagate link state database (LSDB) information to the virtual bridging domain and to discover network topology. The systems and/or methods can use virtual extensible local area network (VX-LAN) encapsulation tunnels at edge nodes to act as a forwarding plane between nodes. The systems and/or methods can use equal-cost multi-path (ECMP) routing among the multiple nodes. The systems and/or methods may address the scalability, resiliency, and efficiency issues associated with network bridges, and may be deployed using existing chipsets and existing network devices.

Figure 1:
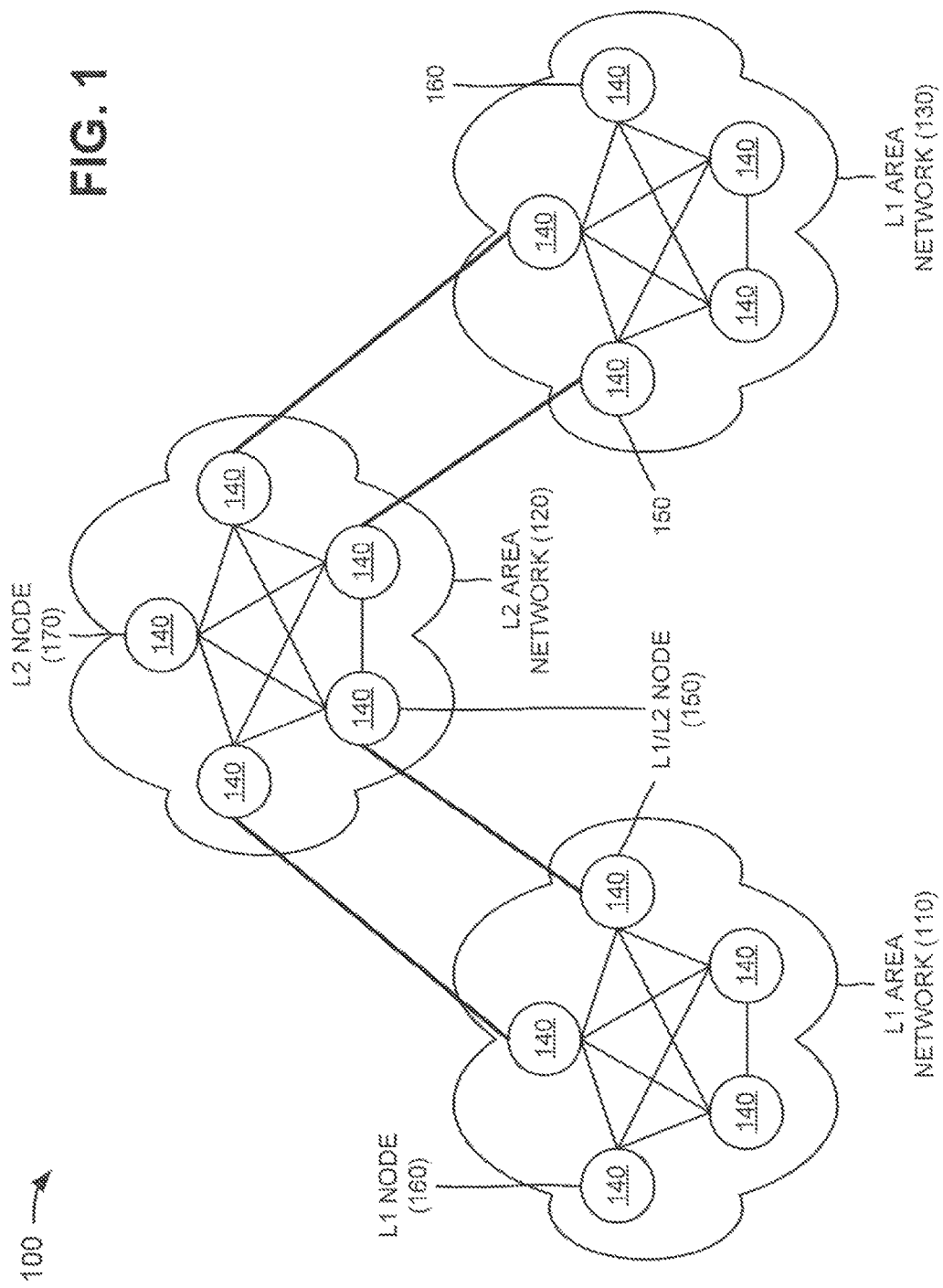
FIG. 1 is a diagram of an example network in which systems and/or methods described herein may be implemented.

FIG. 1 is a diagram of an example network 100 in which systems and/or methods described herein may be implemented. As illustrated, network 100 may include a level one (L1) area network 110, a level two (L2) area network 120, and another L1 area network 130. Each of networks 110-130 may include multiple nodes 140. One or more of the devices and/or networks of network 100 may interconnect via wired and/or wireless connections. Two L1 area networks 110/130, one L2 area network 120, and fifteen nodes 140 have been illustrated in FIG. 1 for simplicity. In practice, there may be more or less L1 area networks 110/130, L2 area networks 120, and/or nodes 140. Also, in some instances, one or more of the devices of network 100 may perform one or more tasks described as being performed by another one or more of the devices of network 100.

L1 area network 110 and L1 area network 130 may include one or more of a same type of packet-switched networks, or one or more packet-switched networks of different types. A "packet" may refer to a packet, a datagram, or a cell; a fragment of a packet, a fragment of a datagram, or a fragment of a cell; or another type, arrangement, or packaging of data. For example, L1 area network 110 and/or L1 area network 130 may include one or more of a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or a Long Term Evolution (LTE) network), an ad hoc network, a telephone network (e.g., the Public Switched Telephone Network (PSTN) or a cellular network), an intranet, the Internet, or a combination of these networks or other types of networks.

L2 area network 120 may include one or more of a same type of packet-switched networks, or one or more packet-switched networks of different types. For example, L2 area network 120 may include one or more of a LAN, a WAN, a MAN, an optical network, a cable television network, a satellite television network, a wireless network (e.g., a CDMA network, a GPRS network, and/or a LTE network), an ad hoc network, a telephone network (e.g., the PSTN or a cellular network), an intranet, the Internet, or a combination of these networks or other types of networks. In one example implementation, L2 area network 120 may include a network (e.g., a WAN) that provides a single bridging domain between L1 area network 110 (e.g., a LAN) and L1 area network 130 (e.g., a LAN).

Node 140 may include any network device that receives and transmits packets within a network or between networks. Node 140 may include, for example, a gateway, a router, a switch, a firewall, a network interface card (NIC), a hub, a bridge, a proxy server, an optical add-drop multiplexer (OADM), a broadband remote access server (BRAS), or some other type of network device (e.g., a layer 2 and/or layer 3 device) that processes and/or transfers traffic (e.g., packets). Node 140 may include one or more ingress interfaces and one or more egress interfaces. Node 140 may receive a packet at one of the ingress interfaces, determine a destination of the received packet, determine an egress interface based on the determined destination, and forward the packet via the determined egress interface.

As further shown in FIG. 1, nodes 140 that directly connect L1 area networks 110/130 with L2 area network 120 may be classified as L1/L2 nodes 150 (or network bridges). Nodes 140 in L1 area networks 110/130 that do not directly connect with L2 area network 120 may be classified as L1 nodes 160. Nodes 140 in L2 area network 120 that do not directly connect with L1 area networks 110/130 may be classified as L2 nodes 170. In one example implementation, L1/L2 nodes 150 may create Ethernet over IP/GRE tunnels to utilize as a forwarding plane between nodes 140 of L1 area networks 110/130 and L2 area network 120. For example, L1/L2 nodes 150 may provide an IP/GRE encapsulation header in a packet traveling between L1 area networks 110/130 and L2 area network 120 so that the packet may utilize the Ethernet over IP/GRE tunnels. The IP/GRE encapsulation header may include a GRE header portion that provides protocol information, among other information, and may include an IP header portion that provides IP routing between nodes 140, among other information. The VXLAN encapsulation header can include a VXLAN header portion that provides protocol information, among other information, and may include an IP header portion that provides IP routing between nodes 140 within a given area network, among other information.

In one example implementation, a node 140 may utilize a modified IS-IS protocol to share information with other nodes 140. The modified IS-IS protocol may utilize existing IP type-length-values (TLVs) for route distribution, may elect redundant multicast root nodes for multicast traffic, and may provide support for multiple area networks and inter-area networks. In one example, the modified IS-IS protocol may propagate LSDB information to the virtual bridging domain in order to discover network topology. In another example, the modified IS-IS protocol may move link level addresses to IP level addresses in order to form paths among nodes 140. The modified IS-IS protocol may reserve multicast addresses (e.g., address "224.0.0.111") for L1 area networks 110/130 nodes 140, and may reserve different addresses (e.g., address "224.0.1.187") for L2 area network 120 nodes 140. In still another example, the modified IS-IS protocol may randomly select node IP addresses, such as addresses "127.x.x.x," "169.254.x.x," or "10.x.x.x."

Although FIG. 1 shows example devices/networks of network 100, in other implementations, network 100 may include fewer devices/networks, different devices/networks, differently arranged devices/networks, or additional devices/networks than depicted in FIG. 1.

Figure 2:
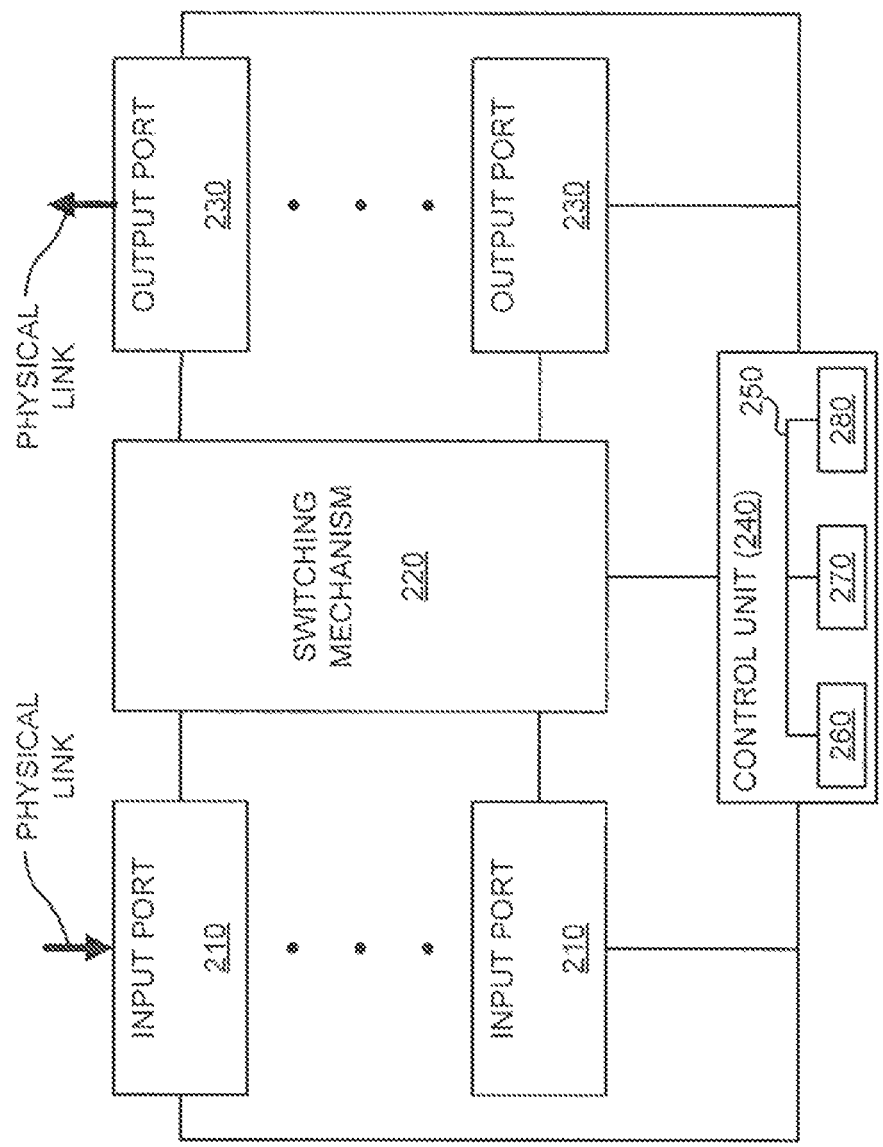
FIG. 2 is a diagram of example components of a node depicted in FIG. 1.

FIG. 2 is a diagram of example components of a device 200 that may correspond to node 140 (FIG. 1). In some instances, node 140 may include one or more devices 200. As shown in FIG. 2, device 200 may include input ports 210, a switching mechanism 220, output ports 230, and a control unit 240.

Input ports 210 may be a point of attachment for physical links and may be a point of entry for incoming traffic, such as packets. Input ports 210 may carry out data link layer encapsulation and decapsulation, for example Ethernet over IP/GRE and/or VXLAN encapsulation and decapsulation. In an example implementation, input ports 210 may send and/or receive packets.

Switching mechanism 220 may interconnect input ports 210 with output ports 230. Switching mechanism 220 may be implemented using many different techniques. For example, switching mechanism 220 may be implemented via busses, crossbars, and/or with shared memories which may act as temporary buffers to store traffic from input ports 210 before the traffic is eventually scheduled for delivery to output ports 230.

Output ports 230 may store packets and may schedule packets for service on output physical links. Output ports 230 may include scheduling algorithms that support priorities and guarantees. Output ports 230 may support data link layer encapsulation and decapsulation, and/or a variety of higher-level protocols. In an example implementation, output ports 230 may send packets and/or receive packets.

Control unit 240 may use routing protocols and one or more forwarding tables for forwarding packets. Control unit 240 may connect with input ports 210, switching mechanism 220, and output ports 230. Control unit 240 may compute a forwarding table, implement routing protocols, and/or run software to configure and manage device 200. Control unit 240 may handle any packet whose destination address may not be found in the forwarding table.

In an example implementation, control unit 240 may include a bus 250 that may include a path that permits communication among a processor 260, a memory 270, and a communication interface 280. Processor 260 may include one or more processors, microprocessors, application-specific integrated circuit (ASICs), field-programmable gate arrays (FPGAs), or other types of processing units that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Memory 270 may also temporarily store incoming traffic (e.g., a header of a packet or an entire packet) from input ports 210, for processing by processor 260, before a packet is directed back to switching mechanism 220, queued in switching mechanism 220, and eventually scheduled to be sent to output ports 230. Communication interface 280 may include any transceiver-like mechanism that enables control unit 240 to communicate with other devices and/or systems.

Device 200 may perform certain operations, as described herein. Device 200 may perform these operations in response to processor 260 executing software instructions contained in a computer-readable medium, such as memory 270. A computer-readable medium may be defined as a non-transitory memory device. A memory device may include space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
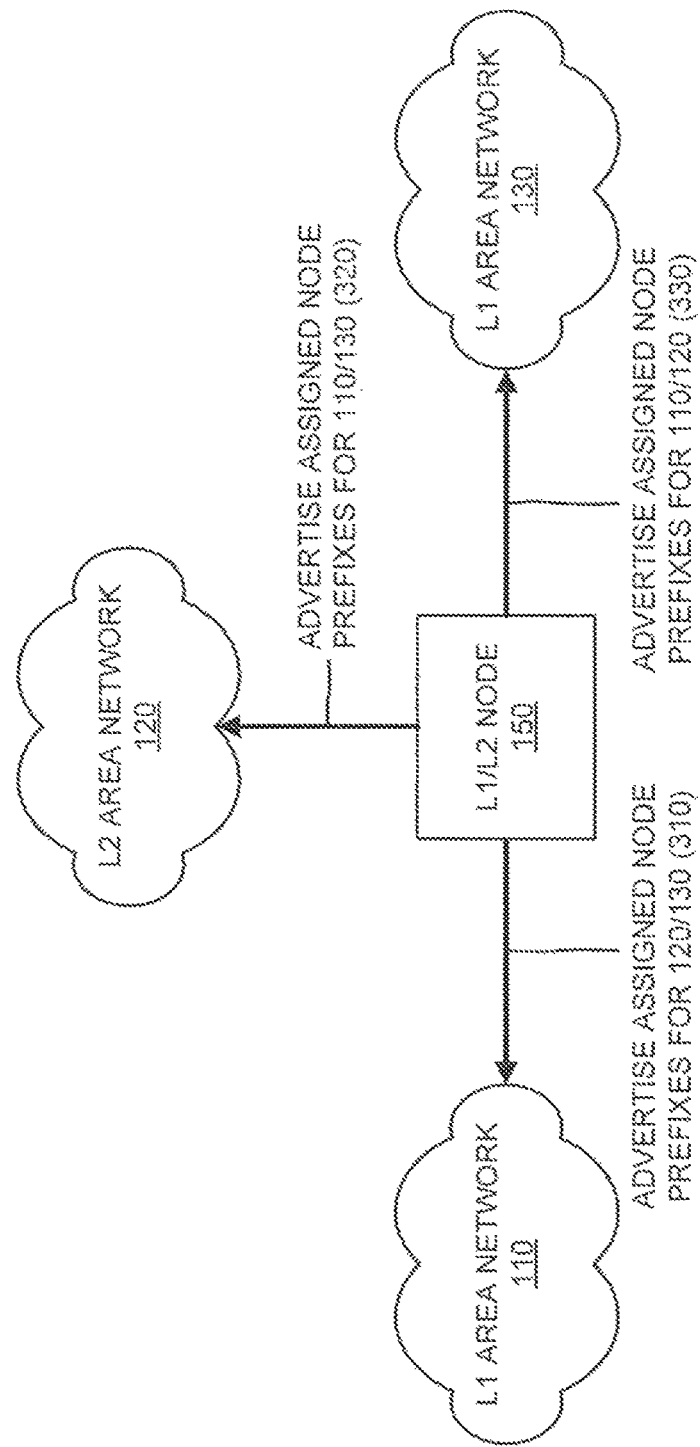
FIG. 3 is a diagram of example operations capable of being performed by an example portion of the network illustrated in FIG. 1.

FIG. 3 is a diagram of example operations capable of being performed by an example portion 300 of network 100. As shown in FIG. 3, example network portion 300 may include L1 area network 110, L2 area network 120, L1 area network 130, and L1/L2 node 150. L1 area network 110, L2 area network 120, L1 area network 130, and L1/L2 node 150 may include the features described above in connection with, for example, one or more of FIGS. 1 and 2.

L1/L2 node 150 may assign a first node prefix to each node 140 of L1 area network 110, may assign a second node prefix to each node 140 of L2 area network 120, and may assign a third node prefix to each node 140 of L1 area network 130. L1/L2 node 150 may store the assigned node prefixes in a memory (e.g., memory 270) associated with L1/L2 node 150. L1/L2 node 150 may advertise the second node prefix and the third node prefix (e.g., the node prefixes assigned to networks 120 and 130) to L1 area network 110, as indicated by reference number 310. L1/L2 node 150 may advertise the first node prefix and the third node prefix (e.g., the node prefixes assigned to networks 110 and 130) to L2 area network 120, as indicated by reference number 320. L1/L2 node 150 may advertise the first node prefix and the second node prefix (e.g., the node prefixes assigned to networks 110 and 120) to L1 area network 130, as indicated by reference number 330.

Such an arrangement may enable L1/L2 node 150 to advertise an area network, to other area networks, without having to advertise all nodes 140 of the area network to the other area networks. This may reduce a number of routes or paths needed across area networks 110-130. In one example, each node prefix may include a unique area identifier (area-id) that identifies an area network of a node, and a prefix length. L1/L2 node 150 may advertise the node prefixes to area networks 110-130 via one or more IS-IS Hello messages.

Although FIG. 3 shows example components of network portion 300, in other implementations, network portion 300 may include fewer components, different components, differently arranged components, or additional components than depicted in FIG. 3. Alternatively, or additionally, one or more components of network portion 300 may perform one or more other tasks described as being performed by one or more other components of network portion 300.

FIG. 4 is a diagram of example functional components of node 140. As shown, node 140 may include fabric ports 410, edge ports 420, a node address 430, and multiple pseudo node addresses 440-1, . . . , 440-N (collectively referred to herein as "pseudo node addresses 440," and, in some instances, individually as "pseudo node address 440"). In one example implementation, one or more of the functional components described in connection with FIG. 4 may be implemented by one or more of the example components of device 200 (FIG. 2).

Fabric ports 410 may include one or more of input ports 210 and/or output ports 230 (FIG. 2). Fabric ports 410 may attach to a network (e.g., a LAN) that is attached to one or more other bridges. Edge ports 420 may include one or more of input ports 210 and/or output ports 230 (FIG. 2). Edge ports 420 may attach to a network (e.g., a LAN) that is not attached to one or more other bridges. If the network attached to a particular edge port 420 attaches to one or more other bridges, the particular edge port 420 may be classified as a fabric port 410.

Node address 430 may correspond to a node IP address for fabric ports 410 and a default VLAN associated with node 140. For example, as shown in FIG. 4, node address 430 may be set to a particular IP address (e.g., "169.254.2.3") for the default VLAN. The default VLAN may communicate with a portion of edge ports 420. Pseudo node address 440 may correspond to a pseudo node IP address for an additional VLAN associated with node 140. For example, as shown in FIG. 4, pseudo node address 440-1 may be set to a particular IP address (e.g., "127.1.8.9") for VLAN-1, and pseudo node address 440-N may be set to a particular IP address (e.g., "127.0.3.7") for VLAN-N. VLAN-1 may communicate with a portion of edge ports 420, and VLAN-N may communicate with another portion of edge ports 420.

In one example implementation, node 140 may randomly select node address 430 for the default VLAN, and may randomly select pseudo node addresses 440 for any additional VLANs (e.g., VLAN-1, . . . , VLAN-N). Node 140 may propagate node address 430 and pseudo node addresses 440 to other nodes 140 in an area network (e.g., one of area networks 110-130, FIG. 1) via IS-IS Hello messages. Node 140 may classify a particular port, of node 140, as a fabric port 410 when the particular port receives an IS-IS Hello message, which may indicate that the particular port is attached to a network (e.g., a LAN) that is attached to one or more other bridges. Node 140 may classify a particular port, of node 140, as an edge port 420 when the particular port does not receive an IS-IS Hello message, which may indicate that the particular port is attached to a network (e.g., a LAN) that is not attached to one or more other bridges.

In another example implementation, a particular node (e.g., L1/L2 node 150) may select a designated forwarding node from one of nodes 140 based on priorities associated with nodes 140. In one example, the designated forwarding node may forward traffic from L1/L2 node 150. The priorities may be based on port speeds associated with nodes 140. If two nodes 140 have the same priority, L1/L2 node 150 may select, as the designated forwarding node, a node 140 with a higher node IP address (e.g., node address 430).

Although FIG. 4 shows example functional components of node 140, in other implementations, node 140 may include fewer functional components, different functional components, differently arranged functional components, or additional functional components than depicted in FIG. 4. Alternatively, or additionally, one or more functional components of node 140 may perform one or more other tasks described as being performed by one or more other functional components of node 140.

Within a single IS-IS based area network, full mesh topology may be constructed by calculating paths in an Nx(N−1) fashion, where N is a number of nodes 140 in the area network. Each node 140 in the area network may calculate paths to all other nodes 140 in the area network, and inter-node traffic may be forwarded via the calculated paths. Thus, path calculation is an $N^2$ procedure for each node 140. In some area networks, most traffic may be provided to a subset of nodes 140, such as root nodes (also referred to as core nodes, central nodes, or tandem nodes). In such area networks, forcing all nodes 140 to calculate $N^2$ paths may unnecessarily burden nodes 140 that do not handle traffic other than traffic provided to the root nodes. In other area networks, most traffic may be forced to the root nodes and the root nodes may direct the traffic to other destinations in the area network.

Figure 5A:
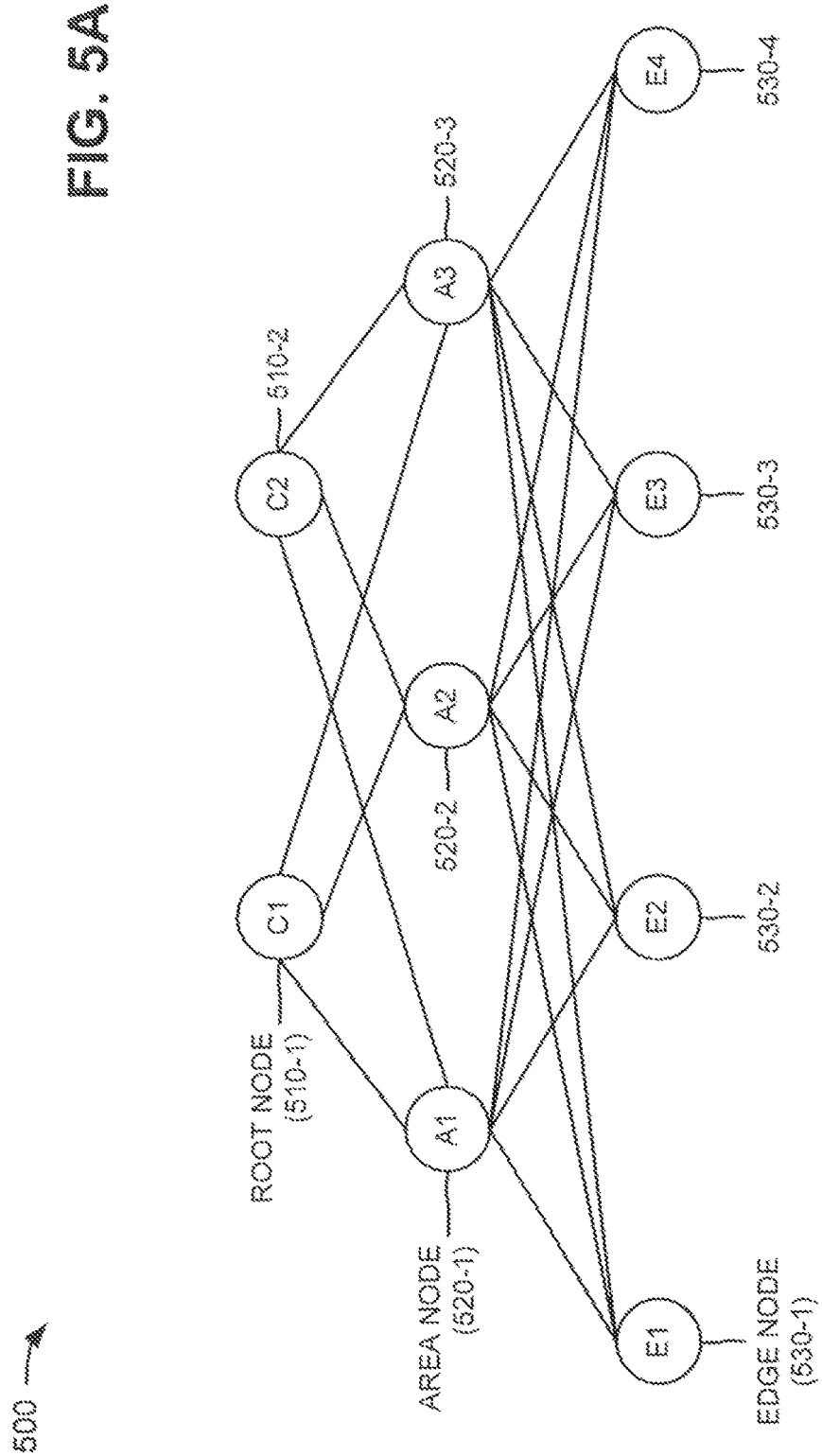
FIG. 5A is a diagram of a physical topology of an example network in which systems and/or methods described herein may be implemented.
Figure 5B:
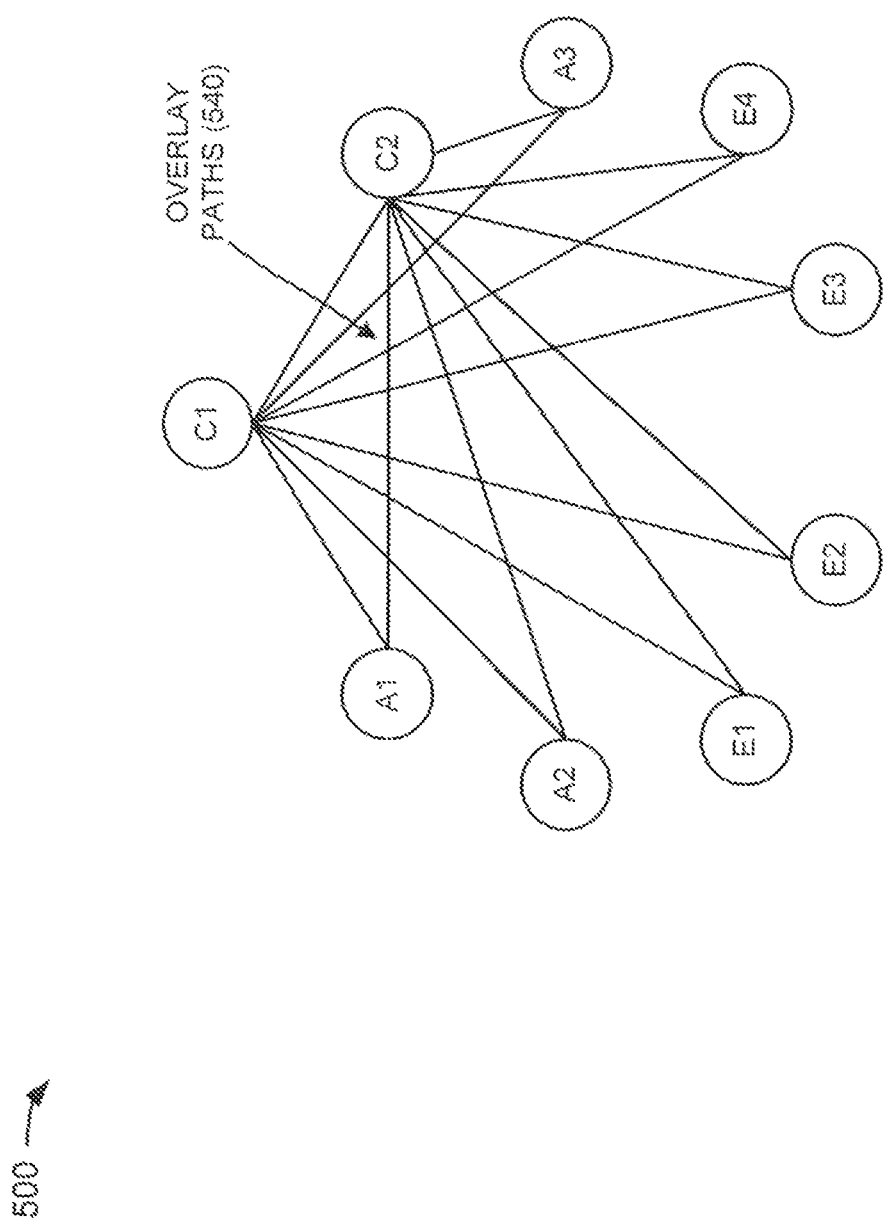
FIG. 5B is a diagram of an overlay topology of the example network depicted in FIG. 5A.

FIGS. 5A and 5B describe an example method that permits an IS-IS based network to create a set of root nodes and that reduces certain nodes' computational loads so that the IS-IS protocol may be used on thin network devices, such as wireless access points (WAPs).

FIG. 5A is a diagram of a physical topology of an example network 500 in which systems and/or methods described herein may be implemented. In one example, network 500 may include the features of L1 area network 110, L2 area network 120, and/or L1 area network 130. As shown in FIG. 5A, network 500 may include root nodes 510-1 and 510-2 (collectively referred to herein as "root nodes 510," and, in some instances, singularly as "root node 510"); area nodes 520-1, 520-2, and 520-3 (collectively referred to herein as "area nodes 520," and, in some instances, singularly as "area node 520"); and edge nodes 530-1, . . . , 530-4 (collectively referred to herein as "edge nodes 530," and, in some instances, singularly as "edge node 530"). In one example implementation, root nodes 510, area nodes 520, and edge nodes 530 may include the features of nodes 140, described above in connection with, for example, one or more of FIGS. 1-4. One or more of the devices of network 500 may interconnect via wired and/or wireless connections.

Root nodes 510 may include nodes (e.g., nodes 140) that are capable of forwarding most (or all) of the traffic processed by network 500. Area nodes 520 may include nodes (e.g. nodes 140) that do not handle traffic in network 500, other than traffic provided to root nodes 510. Edge nodes 530 may include nodes (e.g., nodes 140), provided at edges of network 500, that do not handle traffic in network 500, other than traffic provided to root nodes 510.

Root nodes 510, area nodes 520, and edge nodes 530 may utilize the IS-IS protocol to indicate or advertise an attribute that includes each node's capability to be a root node (or centralized forwarding node) and each node's priority associated with being a root node. The priority associated with being a root node may be user configurable and may be based on each node's capacity, interface, characteristics, etc. Root nodes 510, area nodes 520, and edge nodes 530 may utilize the IS-IS protocol to indicate or advertise distances from other nodes in network 500. The IS-IS protocol may propagate each node's attribute and distance metric to other nodes in network 500.

Each edge node 530 may receive, from root nodes 510, area nodes 520, and other edge nodes 530, the priorities and distances associated with potential root nodes of network 500 (e.g., via the advertised attributes). Each edge node 530 may rank the potential root nodes, based on the received priorities, to create a ranked list of potential root nodes. Edge node 530 may select one or more root nodes (e.g., root nodes 510-1 and 510-2) from the ranked list, based the distances to the potential root nodes, and may calculate shortest paths to the selected root node(s). In one example, edge node 530 may select an active root node and a backup root node for path protection and/or load balancing. Edge node 530 may receive multicast traffic from one or more of the selected root nodes via the calculated shortest paths. Alternatively, or additionally, edge node 530 may receive traffic (e.g., provided to network 500), and may provide the traffic to one or more of the selected root nodes via tunnels. The one or more selected root nodes may forward the traffic within network 500 or outside of network 500. In one example implementation, area nodes 520 may perform operations similar to the aforementioned operations performed by edge nodes 530.

FIG. 5B is a diagram of an overlay topology of example network 500, after edge nodes 530 have selected root nodes (e.g., root nodes 510-1 and 510-2) for network 500. As shown, overlay paths 540 may be provided between root nodes 510-1/510-2 and each of area nodes 520 and edge nodes 530. Overlay paths 540 may correspond to the calculated shortest paths to root nodes 510-1 and 510-2. Each root node 510 may calculate paths (e.g., overlay paths 540) to all nodes in network 500 and may select a shortest path to each node of network 500. The IS-IS protocol may ensure that there are no loops in end-to-end forwarding paths of edge nodes 530. Tunneling may be used where node addresses are placed in tunnel headers. Root nodes 510 may act as tandem nodes in edge-to-edge forwarding. Multiple root nodes may form a tandem hierarchy based on the priorities in the attributes.

The method described above with respect to FIGS. 5A and 5B may reduce computational loads (e.g., due to shortest path calculations) on edge nodes 530 even when network 500 includes a large number of nodes. The reduced computational loads may enable network 500 to utilize thin network devices, such as WAPs, as edge nodes 530. The method may permit extra control for directing traffic to a subset of nodes in network, and may provide more flexibility to network 500 for controlling traffic forwarding.

Although FIGS. 5A and 5B show example components of network 500, in other implementations, network 500 may include fewer components, different components, differently arranged components, or additional components than depicted in FIGS. 5A and 5B. Alternatively, or additionally, one or more components of network 500 may perform one or more other tasks described as being performed by one or more other components of network 500.

Figure 6:
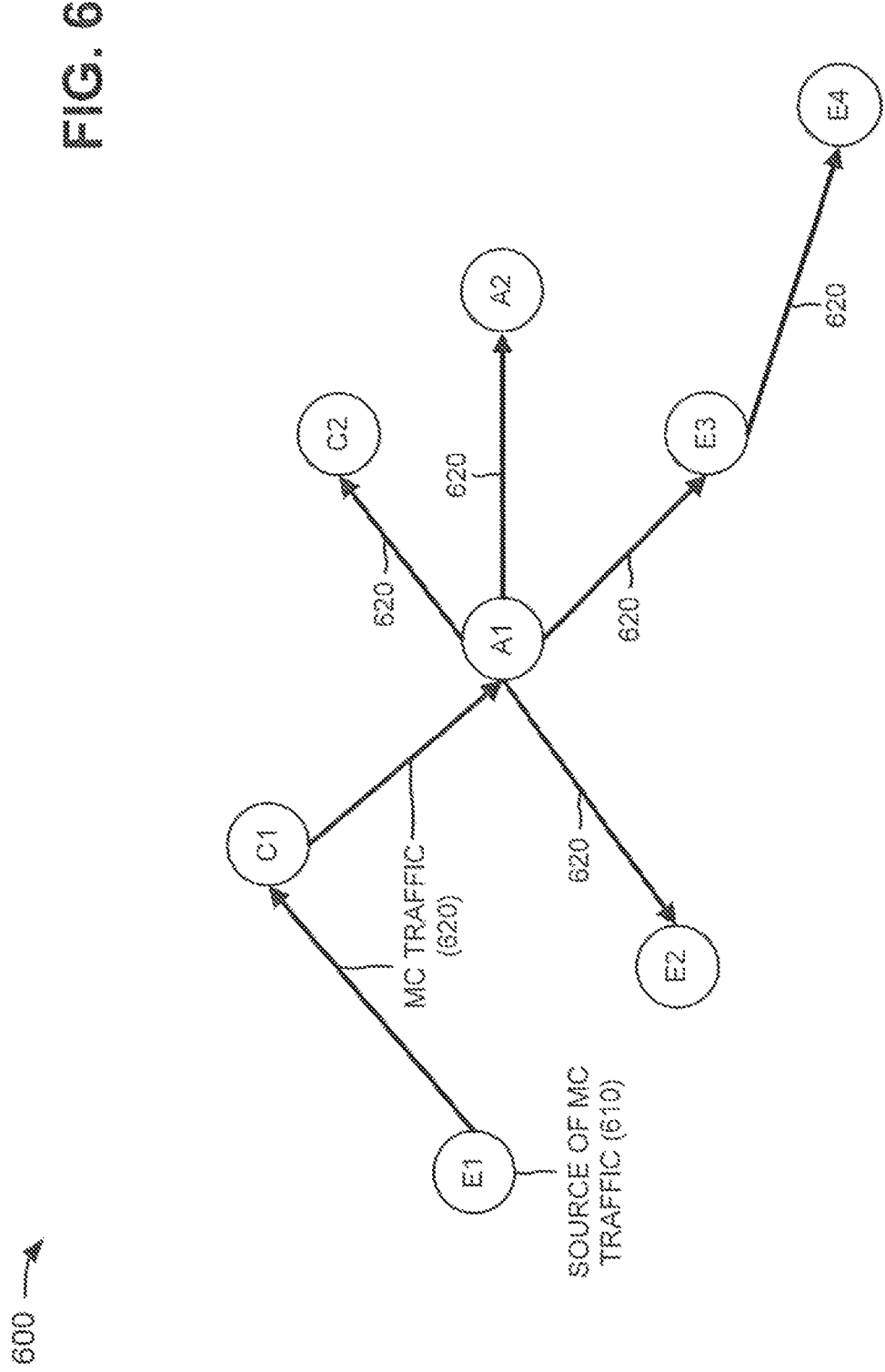
FIG. 6 is a diagram of example operations capable of being performed by an example network in which systems and/or methods described herein may be implemented.

FIG. 6 is a diagram of example multicast forwarding operations capable of being performed by an example network 600 in which systems and/or methods described herein may be implemented. As shown in FIG. 6, network 600 may form a multicast distribution tree that includes root nodes C1 and C2, area nodes A1 and A2, and edge nodes E1, E2, E3, and E4. In one example implementation, root nodes C1/C2, area nodes A1/A2, and edge nodes E1-E4 may include the features of nodes 140, described above in connection with, for example, one or more of FIGS. 1-5B. One or more of the devices of network 600 may interconnect via wired and/or wireless connections.

Multicast root nodes C1/C2 may include the features of root nodes 510 described above in connection with Figs. 5A and 5B. Area nodes A1/A2 may include the features of area nodes 520 described above in connection with FIGS. 5A and 5B. Edge nodes E1-E4 may include the features of edge nodes 530 described above in connection with FIGS. 5A and 5B.

In one example, multicast root nodes C1 and C2 may advertise (e.g., via the attribute described above in connection with FIGS. 5A and 5B), to other nodes in network 600, that root nodes C1 and C2 are capable of being root nodes for multicast traffic. Edge node E1 may select root node C1 as a root node for multicast traffic. In one example, edge node E1 may select root node C1 based on priority information (e.g., distance, bandwidth, etc.) associated with root node C1. Edge node E1 may designate root node C2 as a redundant or backup root node for multicast traffic, which may help with load balancing of multicast traffic in network 600.

As further shown in FIG. 6, edge node E1 may be a source of multicast (MC) traffic, as indicated by reference number 610, and may provide multicast traffic 620 directly to root node C1, via a tunnel. Root node C1 may receive multicast traffic 620 from edge node E1, and may forward multicast traffic 620 to other nodes of network 600 on a hop-by-hop basis. For example, root node C1 may forward multicast traffic 620 to area node A1, and area node A1 may forward multicast traffic 620 to edge nodes E2 and E3, root node C2, and area node A2. Edge node E3 may forward multicast traffic 620 to edge node E4. In one implementation, root node C1 may forward multicast traffic 620 to other nodes of network 600 using a unicast tunnel header and using reverse path forwarding (RPF) to prevent looping. In another implementation, each node in the hop-by-hop path may perform path pruning and each edge node may perform VLAN pruning.

Although FIG. 6 shows example components of network 600, in other implementations, network 600 may include fewer components, different components, differently arranged components, or additional components than depicted in FIG. 6. Alternatively, or additionally, one or more components of network 600 may perform one or more other tasks described as being performed by one or more other components of network 600.

Figure 7:
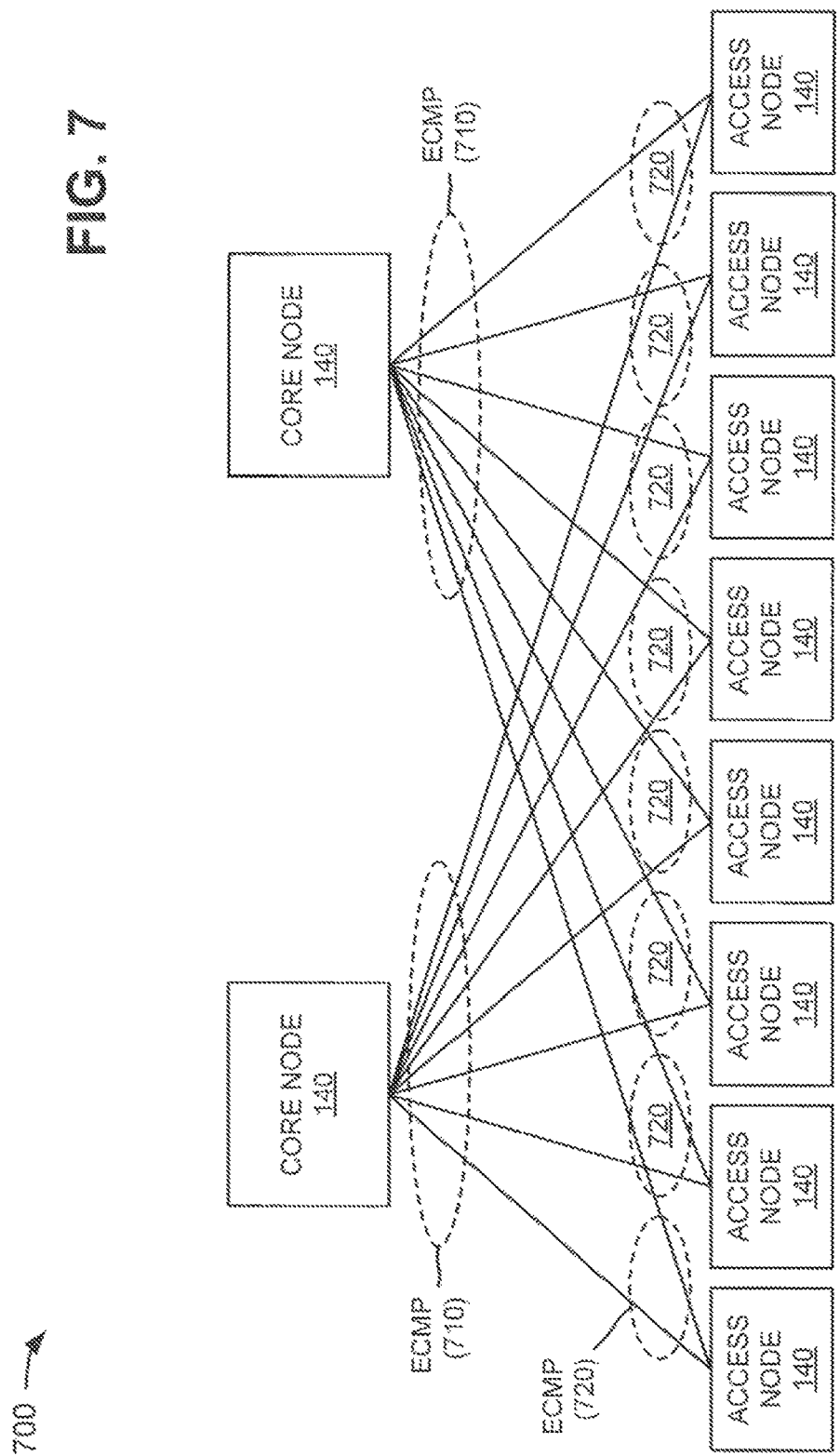
FIG. 7 is a diagram of example operations capable of being performed by another example network in which systems and/or methods described herein may be implemented.

FIG. 7 is a diagram of example operations capable of being performed by another example network 700 in which systems and/or methods described herein may be implemented. In one example, network 700 may include the features of L1 area network 110, L2 area network 120, and/or L1 area network 130. As shown in FIG. 7, network 700 may include a group of access nodes 140 interconnected with a group of core nodes 140. One or more of the devices of network 700 may interconnect via wired and/or wireless connections.

Access nodes 140 may include the features of nodes 140, as described above in connection with, for example, one or more of FIGS. 1-6. Access node 140 may include a network device, such as a gateway, a router, a switch, a firewall, a NIC, a hub, a bridge, a proxy server, an OADM, or some other type of device that processes and/or transfers traffic. In an example implementation, access node 140 may include a device that is capable of transmitting information to and/or receiving information from core nodes 140. In one example, access node 140 may provide client devices (not shown) with access to network 700.

Core nodes 140 may include the features of nodes 140, as described above in connection with, for example, one or more of FIGS. 1-6. Core nodes 140 may include one or more computation or communication devices, that gather, process, and/or provide information in a manner described herein. In one example, core node 140 may include a server device, a laptop computer, a personal computer, a workstation computer, a network device, etc. In an example implementation, core node 140 may include a device that is capable of transmitting information to and/or receiving information from access nodes 140. In other implementations, core nodes 140 may correspond to aggregation nodes provided in an aggregation layer of network 700.

As further shown in FIG. 7, each core node 140 may have ECMP next-hops 710 to each of access nodes 140. Each access node 140 may have ECMP next-hops 720 to each of core nodes 140. In one example implementation, for an N-node domain, each node may have a maximum of N−1 independent ECMP next-hops. ECMP next-hops 710/720 may be created via the modified IS-IS protocol, and may provide flexible hop-by-hop multi-path next-hops. ECMP next-hops 710/720 may provide enough entropy to permit independent path specifications (e.g., MAC address, IP address, etc.). For edge-to-fabric routing, ECMP next-hops 710/720 may be based on a tunnel IP header that includes original layer 2, layer 3, and layer 4 headers. For fabric transit, ECMP next-hops 710/720 may be based on a header that includes passenger layer 2, layer 3, and layer 4 headers.

Although FIG. 7 shows example components of network 700, in other implementations, network 700 may include fewer components, different components, differently arranged components, or additional components than depicted in FIG. 7. In one example, ECMP next-hops 710/720 may be replaced with and/or multi-chassis link aggregation group (MC-LAG) next-hops. Alternatively, or additionally, one or more components of network 700 may perform one or more other tasks described as being performed by one or more other components of network 700.

Figure 8:
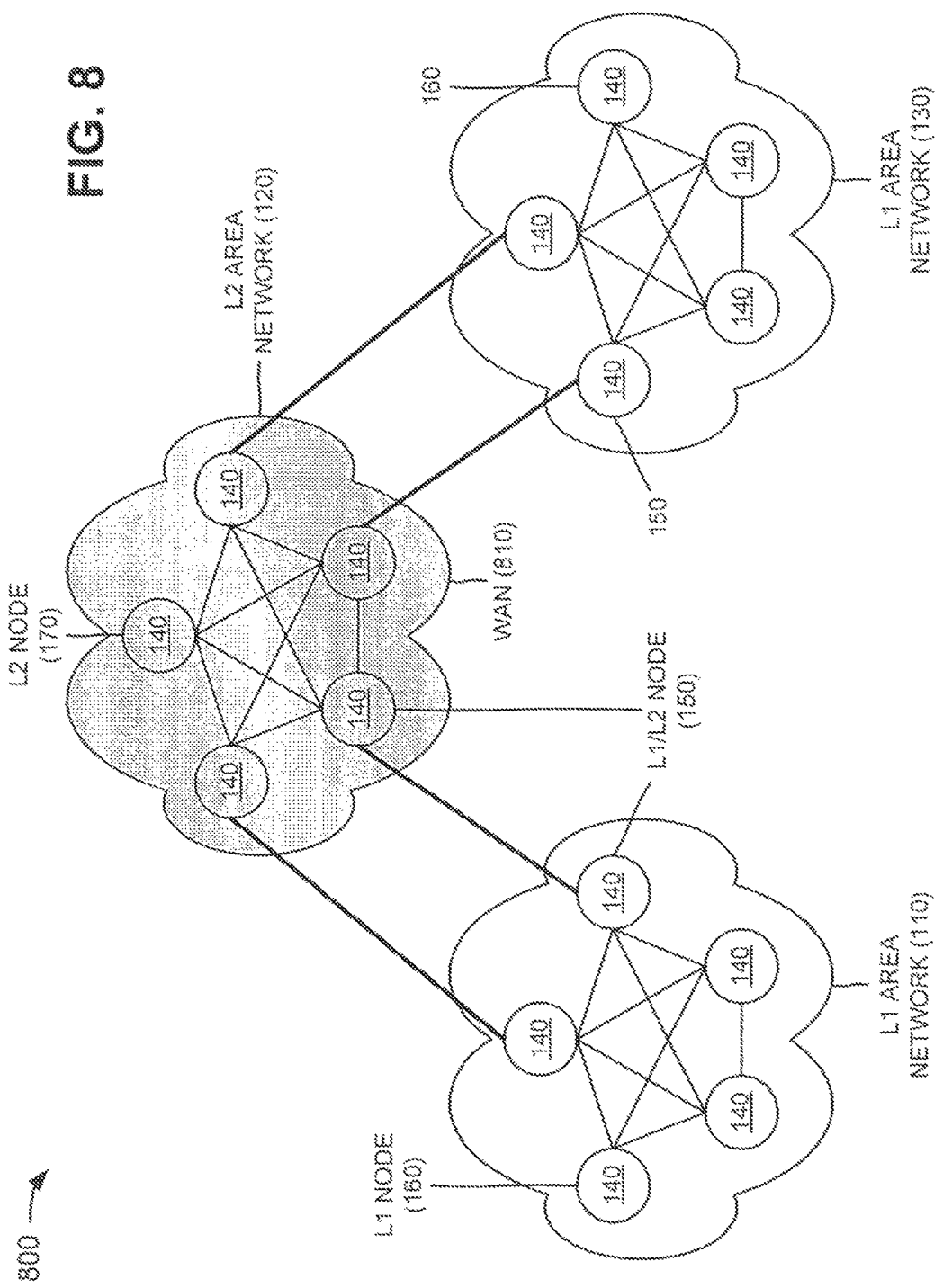
FIG. 8 is a diagram of a first example configuration type for the network depicted in FIG. 1.

FIG. 8 is a diagram of a first example configuration type 800 for network 100 (FIG. 1). As shown in FIG. 8, first configuration type 800 may include L1 area network 110, L2 area network 120, L1 area network 130, nodes 140, L1/L2 nodes 150, L1 nodes 160, and L2 nodes 170. L1 area network 110, L2 area network 120, L1 area network 130, nodes 140, L1/L2 nodes 150, L1 nodes 160, and L2 nodes 170 may include the features described above in connection with, for example, one or more of FIGS. 1-7.

As further shown in FIG. 8, L2 area network 120 may correspond to a WAN 810 that provides an interconnect mechanism between L1 area network 110 and L1 area network 130. In one example implementation, WAN 810 may provide a single bridging domain across multiple campus networks (e.g., L1 area networks 110/130). L1 nodes 160 may calculate routes to L1/L2 nodes 150 for inter-area traffic, and inter-area traffic may be IP routed through L2 nodes 170. L2 nodes 170 may have routes to all areas, and the modified IS-IS protocol may ensure that traffic is loop free among L2 nodes 170.

Although FIG. 8 shows example components of first configuration type 800 of network 100, in other implementations, first configuration type 800 may include fewer components, different components, differently arranged components, or additional components than depicted in FIG. 8. Alternatively, or additionally, one or more components of first configuration type 800 may perform one or more other tasks described as being performed by one or more other components of first configuration type 800.

Figure 9:
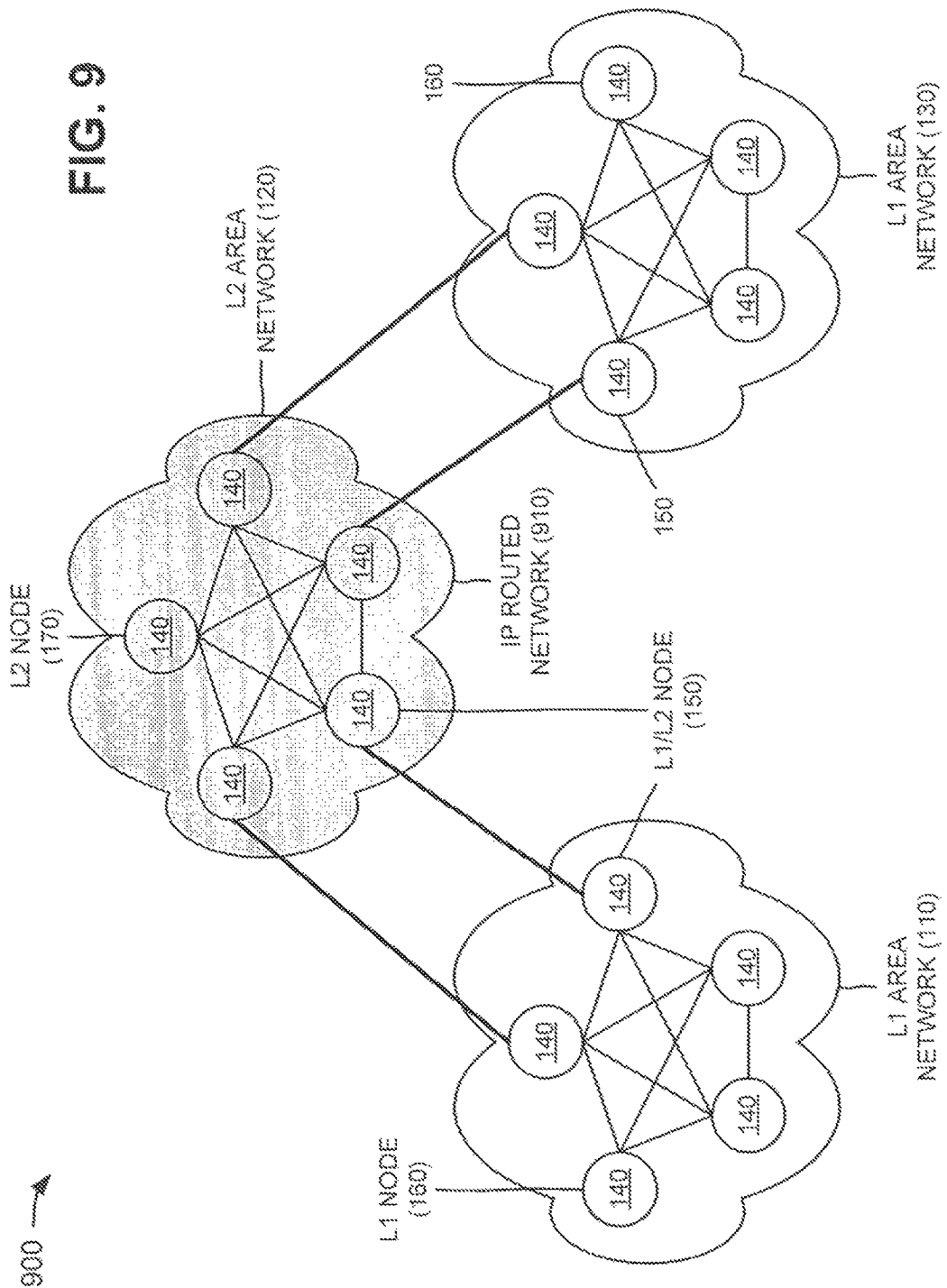
FIG. 9 is a diagram of a second example configuration type for the network illustrated in FIG. 1.

FIG. 9 is a diagram of a second example configuration type 900 for network 100 (FIG. 1). As shown in FIG. 9, second configuration type 900 may include L1 area network 110, L2 area network 120, L1 area network 130, nodes 140, L1/L2 nodes 150, L1 nodes 160, and L2 nodes 170. L1 area network 110, L2 area network 120, L1 area network 130, nodes 140, L1/L2 nodes 150, L1 nodes 160, and L2 nodes 170 may include the features described above in connection with, for example, one or more of FIGS. 1-8.

As further shown in FIG. 9, L2 area network 120 may correspond to an IP routed network 910 that provides an interconnect mechanism between L1 area network 110 and L1 area network 130. In one example implementation, IP routed network 910 may not implement the modified IS-IS protocol.

Although FIG. 9 shows example components of second configuration type 900 of network 100, in other implementations, second configuration type 900 may include fewer components, different components, differently arranged components, or additional components than depicted in FIG. 9. Alternatively, or additionally, one or more components of second configuration type 900 may perform one or more other tasks described as being performed by one or more other components of second configuration type 900.

Figure 10:
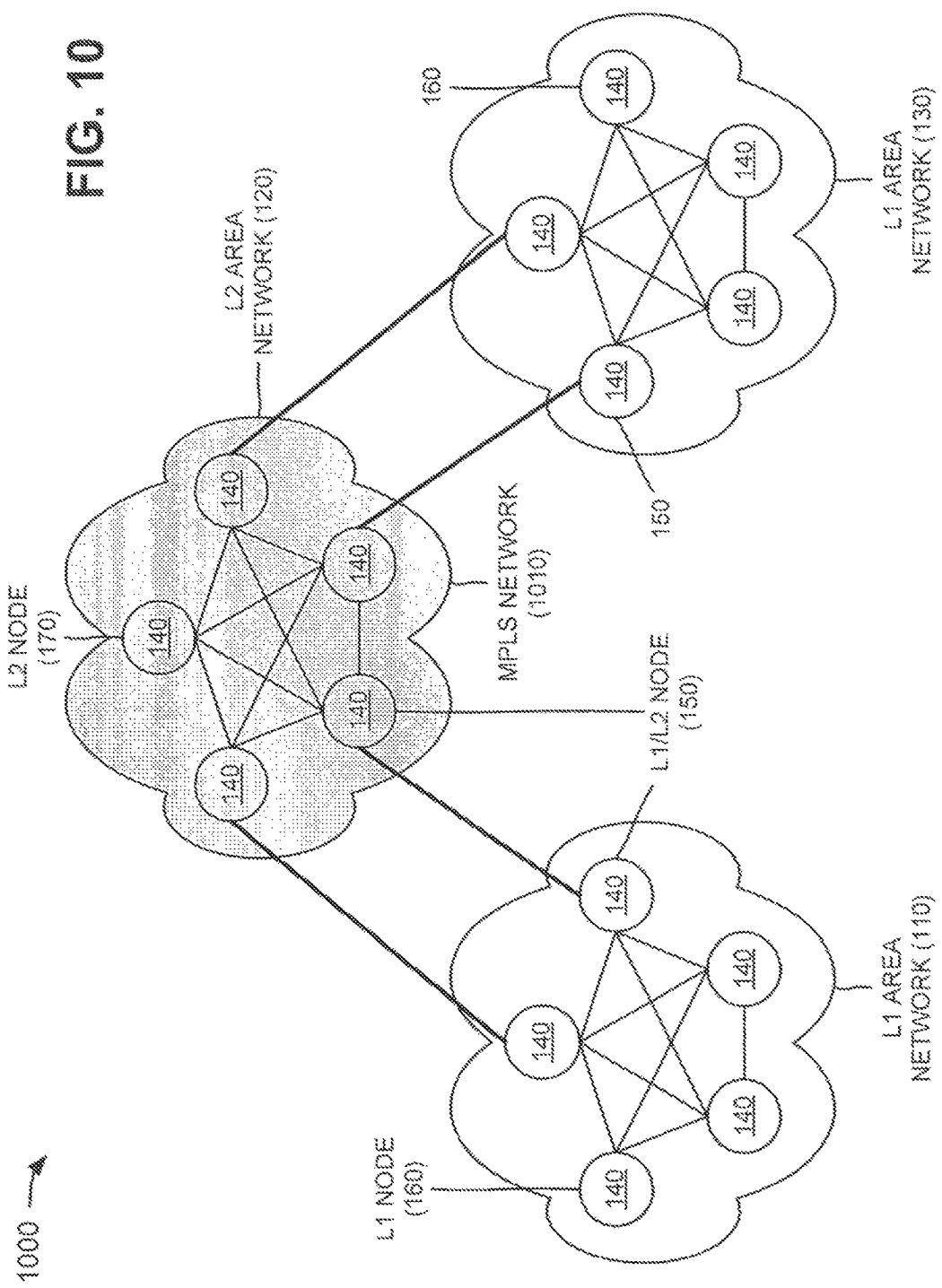
FIG. 10 is a diagram of a third example configuration type for the network depicted in FIG. 1.

FIG. 10 is a diagram of a third example configuration type 1000 for network 100 (FIG. 1). As shown in FIG. 10, third configuration type 1000 may include L1 area network 110, L2 area network 120, L1 area network 130, nodes 140, L1/L2 nodes 150, L1 nodes 160, and L2 nodes 170. L1 area network 110, L2 area network 120, L1 area network 130, nodes 140, L1/L2 nodes 150, L1 nodes 160, and L2 nodes 170 may include the features described above in connection with, for example, one or more of FIGS. 1-9.

As further shown in FIG. 10, L2 area network 120 may correspond to a multiprotocol label switching (MPLS) network 1010 that provides an interconnect mechanism between L1 area network 110 and L1 area network 130. In one example implementation, MPLS network 1010 may provide a single bridging domain across multiple networks (e.g., L1 area networks 110/130). L1/L2 nodes 150 may advertise MPLS transport labels to MPLS network 1010, may map L2-to-L2 paths to MPLS pseudo wires (PWs), and may advertise the MPLS PWs to MPLS network 1010. Each L2 node 170 may perform a PW label exchange with other L2 nodes 170 in order to define a full mesh of PW labels. The PW label exchange may enable MPLS network 1010 to better load balance traffic. The modified IS-IS protocol may provide Hello packets over the PWs. IS-IS exchange may indicate a link type (e.g., MPLS), and may include a value of a MPLS transport label. Each L2 node 170 may encapsulate passenger packets with a path's MPLS PW tunnel label stack.

Although FIG. 10 shows example components of third configuration type 1000 of network 100, in other implementations, third configuration type 1000 may include fewer components, different components, differently arranged components, or additional components than depicted in FIG. 10. Alternatively, or additionally, one or more components of third configuration type 1000 may perform one or more other tasks described as being performed by one or more other components of third configuration type 1000.

Figure 11:
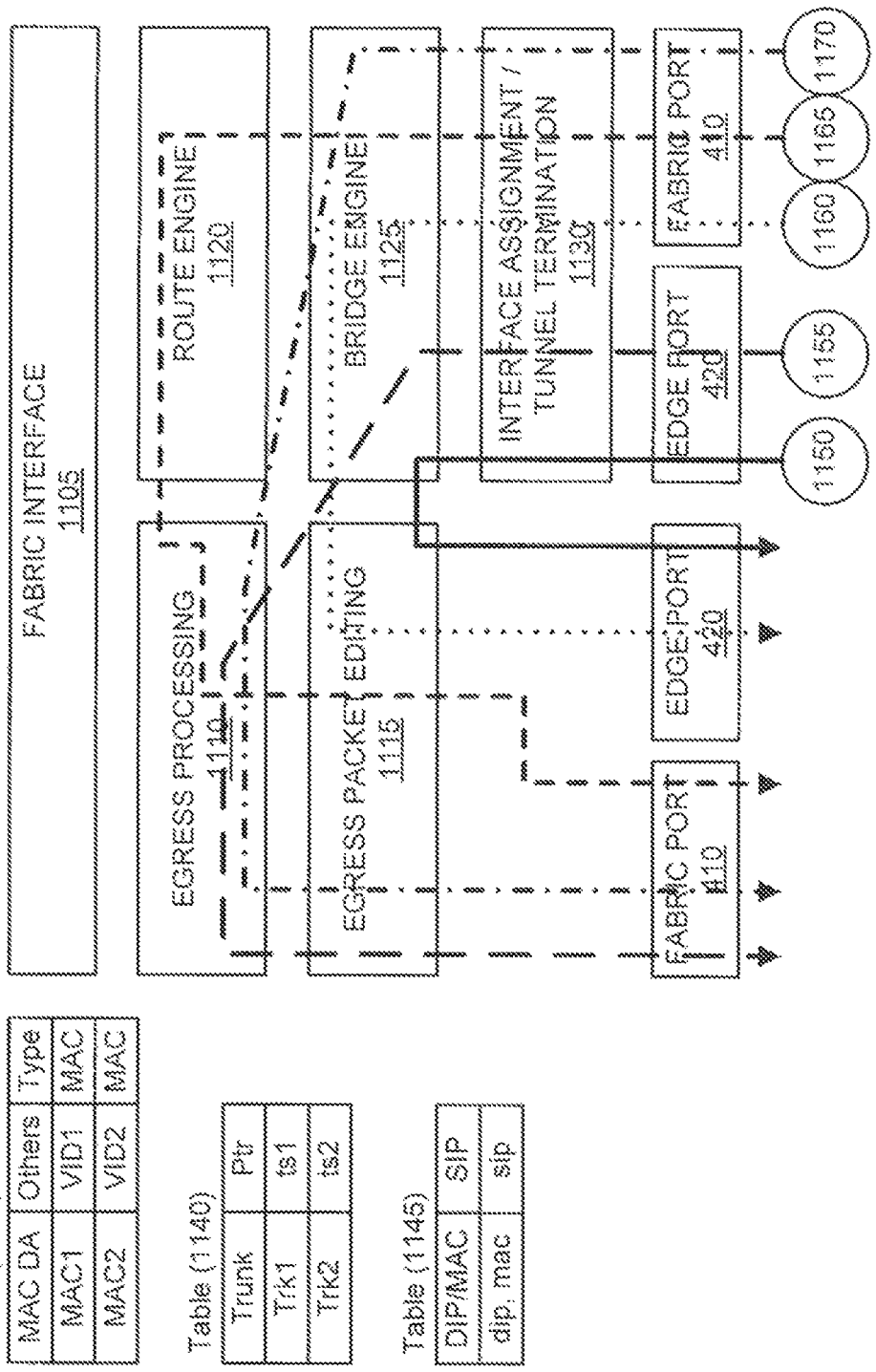
FIG. 11 is a diagram of example functional components of the node depicted in FIG. 1.

FIG. 11 is a diagram of example functional components of node 140. As shown, node 140 may include fabric ports 410, edge ports 420, a fabric interface 1105, an egress processing component 1110, an egress packet editing component 1115, a route engine 1120, a bridge engine 1125, an interface assignment/tunnel termination component 1130, and tables 1135-1145. In one example implementation, one or more of the functional components described in connection with FIG. 4 may be implemented by one or more of the example components of device 200 (FIG. 2). Fabric ports 410 and edge ports 420 may include the features described above in connection with FIG. 4.

Fabric interface 1105 may include a switching or interface component that may allow efficient communication between components of node 140 (e.g., fabric ports 410 and edge ports 420).

Egress processing component 1110 may provide an interface to tables (e.g., table 1145) and may enable components of node 140 to communicate with the tables.

Egress packet editing component 1115 may provide an interface to tables (e.g., for altering headers of packets) and may enable components of node 140 to communicate with the tables.

Route engine 1120 may include a component that may perform high level management functions for node 140. For example, route engine 1120 may communicate with other networks and network devices connected to node 140 to exchange information regarding network topology. Route engine 1120 may create routing tables based on network topology information and forwarding tables based on the routing tables. Route engine 1120 may also perform other general control and monitoring functions for node 140. In one example implementation, route engine 1120 may route traffic between one or more fabric ports 410 and/or edge ports 420.

Bridge engine 1125 may include a component that may perform management functions, associated with inter-area communications, for node 140. For example, bridge engine 1125 may communicate with other networks and network devices, connected to node 140, in order to exchange inter-area communications.

Interface assignment/tunnel termination component 1130 may include a component that assigns an interface of node 140 to traffic received by fabric ports 410 and/or edge ports 420. Interface assignment/tunnel termination component 1130 may provide a termination point for tunnels associated with node 140.

Table 1135 may include a forwarding database (FDB) table that may store MAC addresses that have been learned and from which ports that the MAC addresses were learned. Table 1140 may include a table that identifies a downstream interface for a packet. For example, table 1140 may identify a downstream interface via a trunk field and a pointer field. Table 1145 may include a header alteration table that provides information to alter a header of a packet processed by node 140.

As further shown in FIG. 11, node 140 may provide a path 1150 for local switching traffic received by edge port 420 of node 140. Path 1150 may route the local switching traffic from edge port 420 to bridge engine 1125, via interface assignment/tunnel termination component 1130. Bridge engine 1125 may interact with table 1135, and may route the local switching traffic to another edge port 420, via egress packet editing component 1115.

Node 140 may provide a path 1155 for remote switching traffic received by edge port 420 of node 140. Path 1155 may route the remote switching traffic from edge port 420 to bridge engine 1125, via interface assignment/tunnel termination component 1130. Bridge engine 1125 may interact with table 1135, and may route the remote switching traffic to egress processing component 1110. Egress processing component 1110 may interact with table 1140, and may route the remote switching traffic to egress packet editing component 1115. Egress packet editing component 1115 may interact with table 1145, and may route the remote switching traffic to fabric port 410.

Node 140 may provide a path 1160 for fabric-to-edge traffic received by fabric port 410 of node 140. Path 1160 may route the fabric-to-edge traffic from fabric port 410 to bridge engine 1125, via interface assignment/tunnel termination component 1130. Bridge engine 1125 may interact with table 1135, and may route the fabric-to-edge traffic to edge port 420, via egress packet editing component 1115.

Node 140 may provide a path 1165 for fabric transit traffic received by fabric port 410 of node 140. Path 1165 may route the fabric transit traffic from fabric port 410 to bridge engine 1125, via interface assignment/tunnel termination component 1130. Bridge engine 1125 may interact with table 1135, and may route the fabric transit traffic to route engine 1120. Route engine 1120 may route the fabric transit traffic to egress processing component 1110, and egress processing component 1110 may route the fabric transit traffic to another fabric port 410, via egress packet editing component 1115.

Node 140 may provide a path 1170 for root-to-fabric traffic received by fabric port 410 of node 140. Path 1170 may route the root-to-fabric traffic from fabric port 410 to bridge engine 1125, via interface assignment/tunnel termination component 1130. Bridge engine 1125 may interact with table 1135, and may route the root-to-fabric traffic to egress processing component 1110. Egress processing component 1110 may interact with table 1140, and may route the root-to-fabric traffic to egress packet editing component 1115. Egress packet editing component 1115 may interact with table 1145, and may route the root-to-fabric traffic to another fabric port 410.

Although FIG. 11 shows example functional components of node 140, in other implementations, node 140 may include fewer functional components, different functional components, differently arranged functional components, or additional functional components than depicted in FIG. 11. Alternatively, or additionally, one or more functional components of node 140 may perform one or more other tasks described as being performed by one or more other functional components of node 140.

Figure 12:
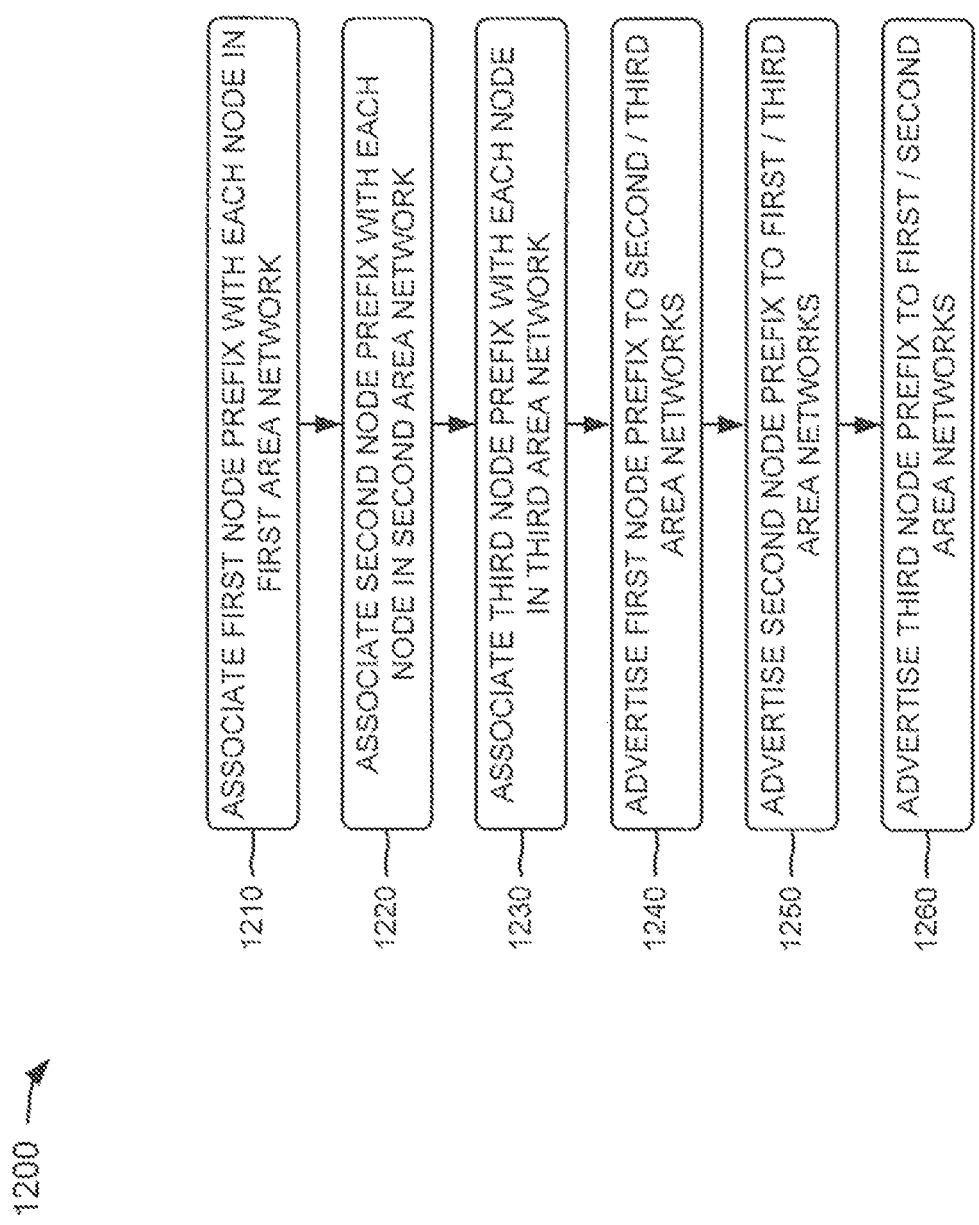
FIG. 12 is a flow chart of an example process for forming a multi-device switched fabric using Internet protocol (IP)-routed or switched networks according to an implementation described herein.

FIG. 12 is a flow chart of an example process 1200 for forming a multi-device switched fabric using IP-routed or switched networks according to an implementation described herein. In one implementation, process 1200 may be performed by L1/L2 node 150. In another implementation, some or all of process 1200 may be performed by one or more devices other than L1/L2 node 150 or in combination with L1/L2 node 150. One or more of the process blocks depicted in FIG. 12 may be performed concurrently and independently of one or more other process blocks.

As illustrated in FIG. 12, process 1200 may include associating a first node prefix with each node in a first area network (block 1210), associating a second node prefix with each node in a second area network (block 1220), and associating a third node prefix with each node in a third area network (block 1230). For example, in an implementation described above in connection with FIG. 3, L1/L2 node 150 may assign a first node prefix to each node 140 of L1 area network 110, may assign a second node prefix to each node 140 of L2 area network 120, and may assign a third node prefix to each node 140 of L1 area network 130. L1/L2 node 150 may store the assigned node prefixes in a memory (e.g., memory 270) associated with L1/L2 node 150.

As further shown in FIG. 12, process 1200 may include advertising the first node prefix to the second and third area networks (block 1240), advertising the second node prefix to the first and third area networks (block 1250), and advertising the third node prefix to the first and second area networks (block 1260). For example, in an implementation described above in connection with FIG. 3, L1/L2 node 150 may advertise the second node prefix and the third node prefix (e.g., the node prefixes assigned to networks 120 and 130) to L1 area network 110, as indicated by reference number 310. L1/L2 node 150 may advertise the first node prefix and the third node prefix (e.g., the node prefixes assigned to networks 110 and 130) to L2 area network 120, as indicated by reference number 320. L1/L2 node 150 may advertise the first node prefix and the second node prefix (e.g., the node prefixes assigned to networks 110 and 120) to L1 area network 130, as indicated by reference number 330.

FIG. 13 is a flow chart of an example process 1300 for propagating node IP addresses and for classifying ports according to an implementation described herein. In one implementation, process 1300 may be performed by node 140. In another implementation, some or all of process 1300 may be performed by one or more devices other than node 140 or in combination with node 140. One or more of the process blocks depicted in FIG. 13 may be performed concurrently and independently of one or more other process blocks.

As illustrated in FIG. 13, process 1300 may include randomly selecting a node IP address for a default VLAN (block 1310), and determining whether there is an additional VLAN (block 1320). If there is an additional VLAN (block 1320—YES), process 1300 may include randomly selecting a pseudo node IP address for the additional VLAN (block 1330). For example, in an implementation described above in connection with FIG. 4, node 140 may randomly select node address 430 for the default VLAN, and may randomly select pseudo node addresses 440 for any additional VLANs (e.g., VLAN-1, . . . , VLAN-N).

As further shown in FIG. 13, process 1300 may include propagating the node IP address and the pseudo node IP address to other nodes in an area network (block 1340), classifying a port as a fabric port when the port receives a Hello message (block 1350), and classifying a port as an edge port when the port does not receive a Hello message (block 1360). For example, in an implementation described above in connection with FIG. 4, node 140 may propagate node address 430 and pseudo node addresses 440 to other nodes 140 in an area network (e.g., one of area networks 110-130, FIG. 1) via IS-IS Hello messages. Node 140 may classify a particular port, of node 140, as a fabric port 410 when the particular port receives an IS-IS Hello message, which may indicate that the particular port is attached to a network (e.g., a LAN) that is attached to one or more other bridges. Node 140 may classify a particular port, of node 140, as an edge port 420 when the particular port does not receive an IS-IS Hello message, which may indicate that the particular port is attached to a network (e.g., a LAN) that is not attached to one or more other bridges.

Figure 14:
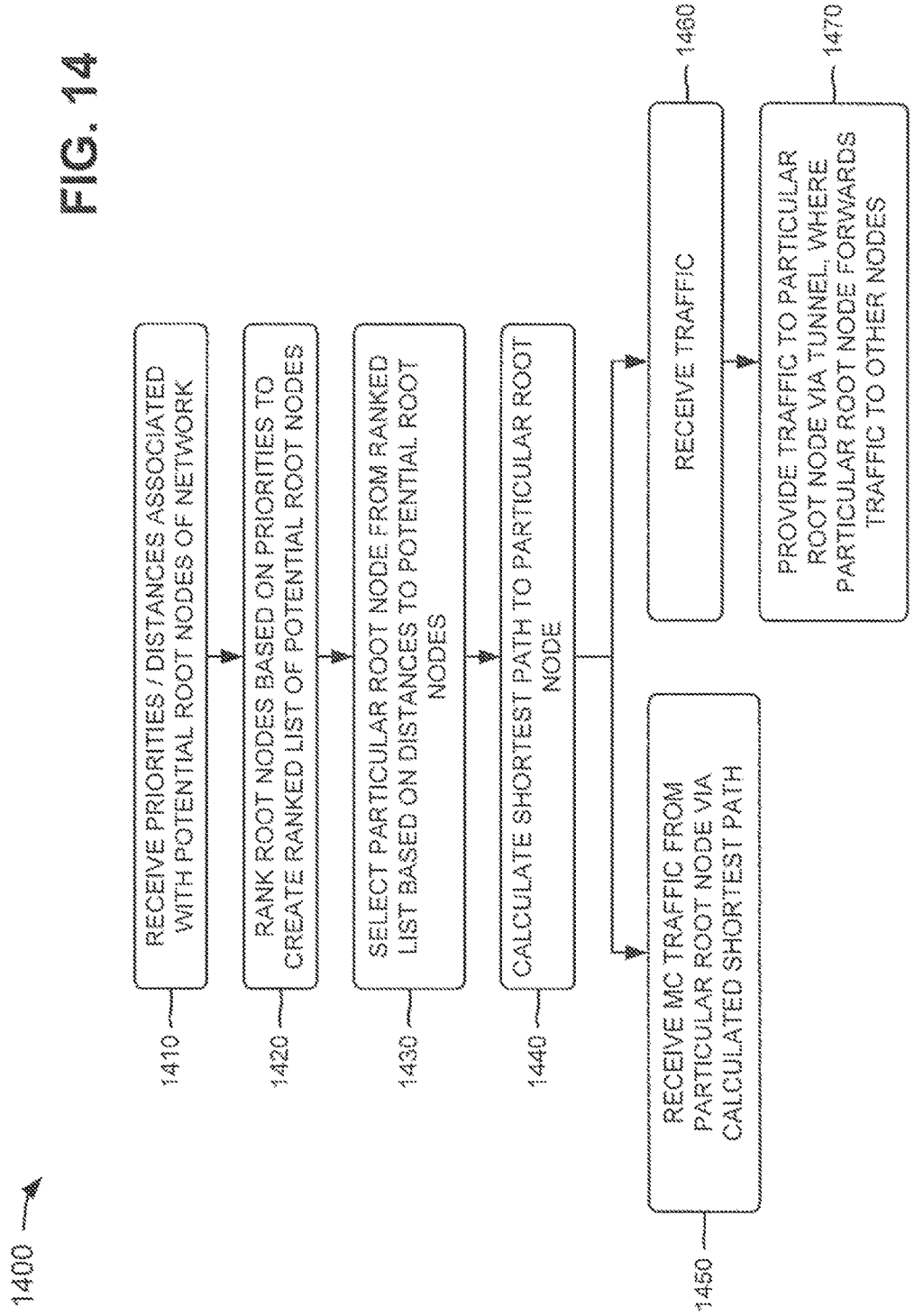
FIG. 14 is a flow chart of an example process for routing traffic from a particular root node via a calculated shortest path.

FIG. 14 is a flow chart of an example process 1400 for routing traffic from a particular root node via a calculated shortest path. In one implementation, process 1400 may be performed by edge node 530. In another implementation, some or all of process 1400 may be performed by one or more devices other than edge node 530 (e.g., area node 520) or in combination with edge node 530. One or more of the process blocks depicted in FIG. 14 may be performed concurrently and independently of one or more other process blocks.

As illustrated in FIG. 14, process 1400 may include receiving priorities and/or distances associated with potential root nodes of a network (block 1410), and ranking the root nodes based on the priorities to create a ranked list of potential root nodes (block 1420). For example, in an implementation described above in connection with FIG. 5A, each edge node 530 may receive, from root nodes 510, area nodes 520, and other edge nodes 530, the priorities and distances associated with potential root nodes of network 500 (e.g., via the advertised attributes). Each edge node 530 may rank the potential root nodes, based on the received priorities, to create a ranked list of potential root nodes.

As further shown in FIG. 14, process 1400 may include selecting a particular root node from the ranked list based on distances to the potential rood nodes (block 1430), and calculating a shortest path to the particular root node (block 1440). For example, in an implementation described above in connection with FIG. 5A, edge node 530 may select one or more root nodes (e.g., root nodes 510-1 and 510-2) from the ranked list, based the distances to the potential root nodes, and may calculate shortest paths to the selected root node(s). In one example, edge node 530 may select an active root node and a backup root node for path protection and/or load balancing. Such an arrangement may significantly reduce a computational load on edge node 530.

Returning to FIG. 14, process 1400 may include receiving multicast traffic from the particular root node via the calculated shortest path (block 1450). Alternatively, or additionally, process 1400 may include receiving traffic (block 1460), and providing the traffic to the particular root node via a tunnel, where the particular root node forwards the traffic to other nodes (block 1470). Edge node 530 may receive multicast traffic from one or more of the selected root nodes via the calculated shortest paths. Alternatively, or additionally, edge node 530 may receive traffic, and may provide the traffic to one or more of the selected root nodes via tunnels. The one or more selected root nodes may forward the traffic within network 500 or outside of network 500.

Figure 15:
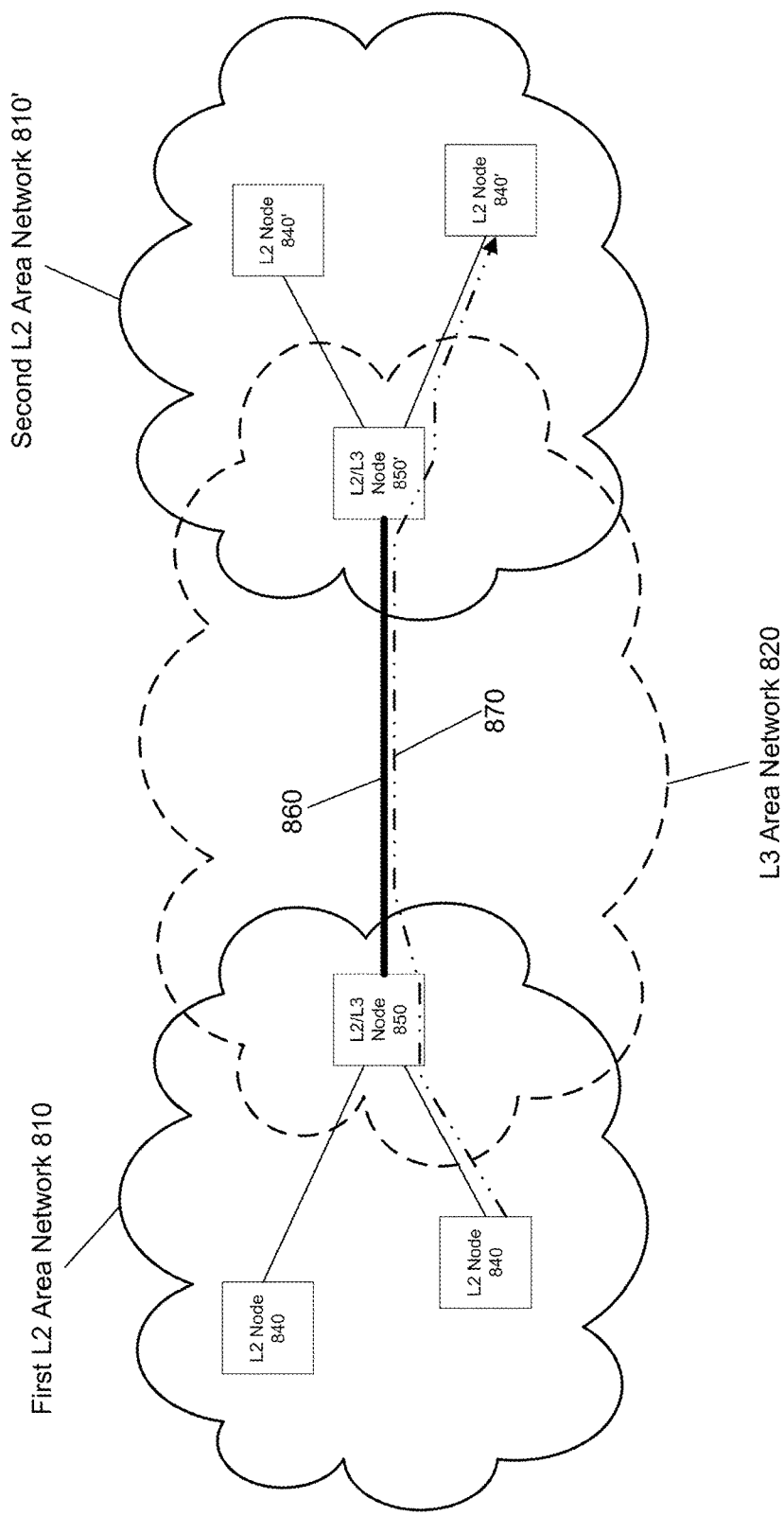
FIG. 15 is a system block diagram of an example network in which systems and/or methods described herein may be implemented.

FIG. 15 is a system block diagram of a layer-two network bridging system 800 ("system 800"). As described herein, system 800 depicts multiple layer-two local area networks bridged via a layer-three network using a VXLAN tunnel. As described herein, system 800 can enable multiple layer-two local area networks to communicate with each other using layer-two communications. System 800 includes a first layer-two network 810, a second layer-two network 810' and a layer-three network 820. First layer-two network 810 and second layer-two network 810' can be similar to L1 Area Networks 110, 130 described above with reference to FIG. 1, and layer-three network 820 can be similar to L2 Area Network 120. First layer-two network 810 includes an L2/L3 node 850 similar to L1/L2 node 150, and L2 nodes 840 similar to L1 nodes 140. In some embodiments, nodes (e.g., L2/L3 node 850 and/or L2 nodes 840) can communicate with other nodes with L2 area network 810 using layer-two communications, for example, forwarding data units. Second layer-two network 810' can be similar to first layer-two network 810 and includes an L2/L3 node 850' and L2 nodes 840'. In some embodiments, nodes (e.g., L2/L3 node 850' and/or L2 nodes 840') can communicate with other nodes within second L2 area network 810' using layer-two communications, for example, forwarding data units. System 800 can define a VXLAN tunnel 860 between L2/L3 node 850 and L2/L3 node 850'. Said another way, VXLAN tunnel 860 can include a path between L2/L3 node 850 and L2/L3 node 850' that includes any number of nodes (not shown) of L3 area network 820. As shown in FIG. 15, a data unit (not shown) can travel from an L2 node 840 in first L2 area network 810 to and L2 node 840' in second L2 area network 810' via L2/L3 nodes 850, 850' and VXLAN tunnel 860, e.g., along a path 870 traversing any number of the nodes of L3 area network 820. In some embodiments, traversing VXLAN tunnel 860 can include a data unit being layer-three routed between the any number of nodes of the L3 area network 820.

Figure 16:
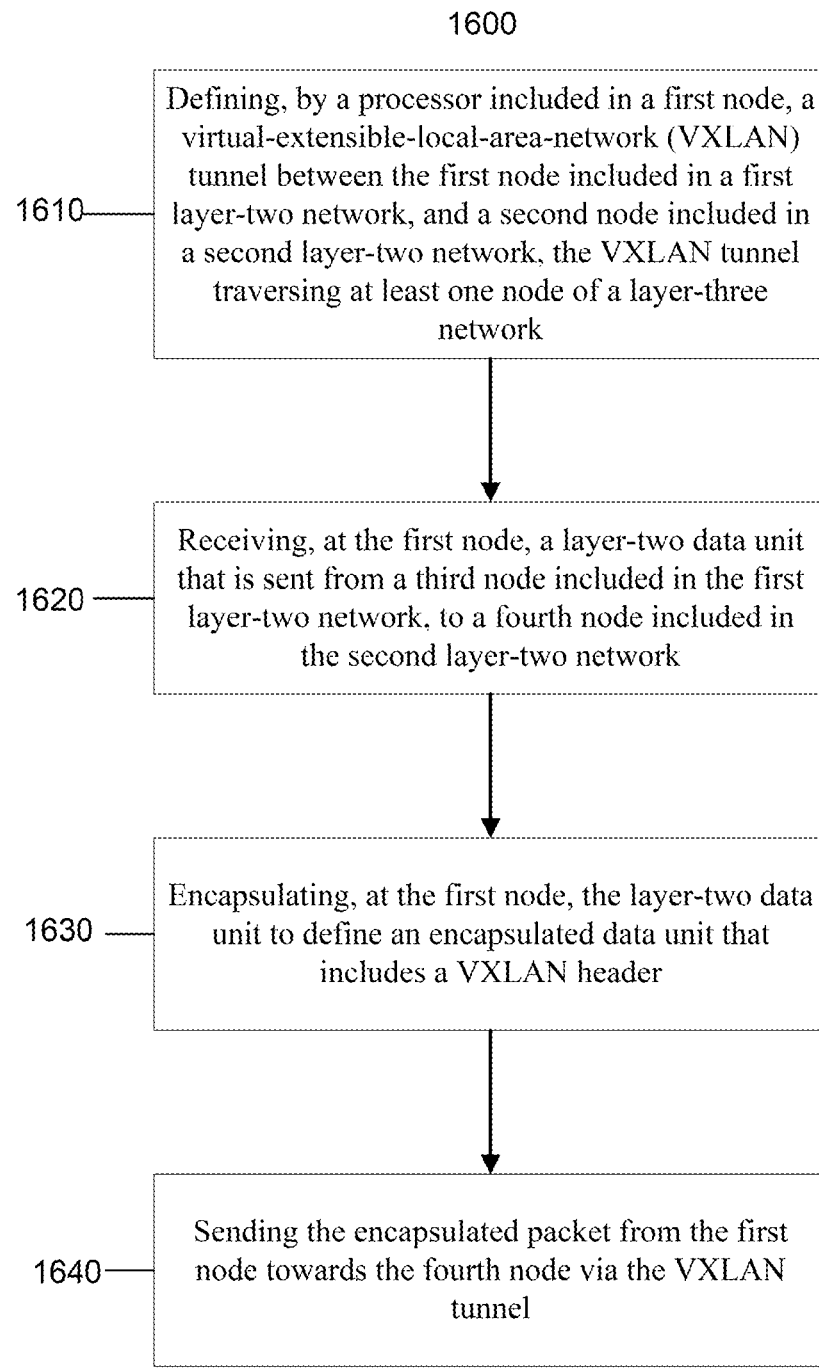
FIG. 16 is a flow chart of an example process for routing traffic from a node in one network to a node in another network via a tunnel.

FIG. 16 is an example process 1600 for routing traffic from a particular node in a first network to a particular node in a second network, via a tunnel, according to an embodiment. Process 1600 includes defining, by a processor included in a first node, a virtual-extensible-local-area-network (VXLAN) tunnel between the first node included in a first layer-two network, and a second node included in a second layer-two network, the VXLAN tunnel comprising at least one node of a layer-three network, at 1610. For example, and with reference to FIG. 16, a processor in L2/L3 node 850 can define a VXLAN tunnel to L2/L3 node 850'. Process 1600 includes receiving, at the first node, a layer-two data unit that is sent from a third node included in the first layer-two network, to a fourth node included in the second layer-two network, at 1620. With continued reference to FIG. 15, L2/L3 node 850 can receive a data unit from an L2 node 840 that is being sent to, for example, any of L2 nodes 840'. Process 1600 includes encapsulating, at the first node, the layer-two data unit to define an encapsulated data unit that includes a VXLAN header, at 1630. With continued references to FIG. 15, L2/L3 node 850 can encapsulate the layer-two data unit. Process 1600 includes sending the encapsulated packet from the first node towards the fourth node via the VXLAN tunnel, at 1640. With continued references to FIG. 15, L2/L3 node 850 can send the encapsulated data unit to, for example, any of L2 nodes 840' via VXLAN tunnel 860.

With regards to system 800 in FIG. 15 and process 1600 described in FIG. 16, the type of node (e.g., a node specific hardware and/or software configuration) may not affect whether nodes in different networks can communicate. Said another way, by using VXLAN encapsulation and tunnels, a node in a first layer-two network can send a layer-two data unit to a node in a different layer-two network, even if the node in the first layer-two network, and the node in the second layer-two network includes different hardware and/or software combinations, for example, different ASICs. By way of example, a first local area network can include network devices that each includes the same, similar and/or otherwise compatible ASICs. Specifically, the ASIC of each network device in the first local area network can be specifically designed to operate a first application, for example, a function, software and/or software version. To expand the first local area network such that all network devices in the first local area network can use layer-two capabilities, network devices added to the first local area network typically need to be specifically designed to operate the first application.

As described herein, however, the first local area network can be effectively expanded to include a second local area network that may have network devices specifically designed to operate a second application and not the first application. This can be accomplished by coupling the first area network to the second area network using a layer-two bridging domain that can use layer-three communications via VXLAN encapsulation and tunnels. In one example, with reference to FIG. 15, VXLAN tunnel 860 can be established between L2/L3 node 850 and L2/L3 node 850'. Thereafter, when network devices having layer-two capabilities is added to either first L2 area network 810 or second L2 area network 810', that newly-added network device can be advertised and/or otherwise made available to devices in both of first L2 area network 810 and second L2 area network 810'. By way of example, if a printer with plug-n-play capability is added to first L2 area network 810, that printer (L2 node 840) can broadcast an advertisement to all nodes in first L2 area network 810. When L2/L3 node 850 receives that broadcast, the advertisement can be encapsulated with a VXLAN header, transmitted through VXLAN tunnel 860, received and decapsulated by L2/L3 node 850' and rebroadcast to all nodes in second L2 area network 810'.

Systems and/or methods described herein may provide a virtual bridging architecture that enables multiple network devices (or nodes) to automatically form multiple shortest paths among the multiple nodes without loops. The multiple shortest paths may span across a variety of networks (e.g., legacy switched and routed networks) and may construct a virtual bridging domain that appears as a single network device. The systems and/or methods may utilize Ethernet over IP/GRE tunnels at edge nodes to act as a forwarding plane between nodes, VXLAN tunnels at edge nodes to act as a forwarding plane between nodes, and may utilize a modified IS-IS protocol to propagate LSDB information to the virtual bridging domain and to discover network topology. The systems and/or methods may utilize ECMP routing as a basis for creating the multiple shortest paths among the multiple nodes. The systems and/or methods may address the scalability, resiliency, and efficiency issues associated with network bridges, and may be deployed using existing chipsets and existing network devices. The systems and methods described herein may provide a way to scale networks that include nodes having different, and possible incompatible hardware and/or software combinations, such nodes having different ASICs.

The term component, as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 12-14, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
defining, by a processor included in a first node, a virtual-extensible-local-area-network (VXLAN) tunnel between the first node that is from a first plurality of nodes and included in a first layer-two network, and a second node that is from a second plurality of nodes and included in a second layer-two network, the VXLAN tunnel traversing at least one node of a layer-three network, the first node including an application specific integrated circuit (ASIC) configured to execute a first application and not a second application, the second node including an ASIC configured to execute the second application and not the first application;
assigning, at the first node, a node prefix to each node from the first plurality of nodes included in the first layer-two network;
advertising, from the first node and via the VXLAN tunnel, the node prefix to the second node in the second layer-two network without advertising a node identifier uniquely associated with each node from the first plurality of nodes to the second node in the second layer-two network;
receiving, at the first node, a layer-two data unit that is sent from a third node that is from the first plurality of nodes and included in the first layer-two network, to a fourth node that is from the second plurality of nodes and included in the second layer-two network;
encapsulating, at the first node, the layer-two data unit to define an encapsulated data unit that includes a VXLAN header;
sending the encapsulated data unit from the first node towards the fourth node via the VXLAN tunnel.

2. The method of claim 1, further comprising defining the VXLAN tunnel in response to an intermediate system (IS)-to-IS Hello message.

3. The method of claim 1, wherein the VXLAN header includes an internet protocol (IP) address.

4. The method of claim 1, further comprising receiving the layer-two data unit from a fifth node that is included in the first layer-two network and that is not directly coupled to the layer-three network.

5. The method of claim 4, wherein:
the fifth node is coupled to the first node via a fabric port of the first node, and
the second node is coupled to the first node via an edge port of the first node.

6. The method of claim 1, wherein:
the layer-two data unit is a first layer-two data unit; and
the method further includes receiving a second layer-two data unit from a fifth node assigned the node prefix.

7. The method of claim 1, wherein:
the third node including the ASIC configured to execute the first application and not the second application, and
the fourth node including the ASIC configured to execute the second application and not the first application.

8. The method of claim 1, wherein the layer-two data unit is a broadcast message to the first plurality of nodes in the first layer-two network.

9. An apparatus, comprising:
a first network device configured to be included in a first layer-two network and configured to be operatively coupled, via a virtual-extensible-local-area-network (VXLAN) tunnel traversing at least one node of a layer-three network, to a second network device that is included in a second layer-two network, the first network device including an application specific integrated circuit (ASIC) configured to execute a first application and not a second application, the second network device including an ASIC configured to execute the second application and not the first application,
the first network device configured to receive a node prefix advertised from the second network device and via the VXLAN tunnel, the node prefix assigned to each network device from a plurality of network devices included in the second layer-two network, the plurality of network devices including the second network device,
the first network device configured to receive an encapsulated data unit from the second network device via the VXLAN tunnel,
the first network device configured to decapsulate the encapsulated data unit to define a decapsulated data unit,
the first network device configured to layer-two forward the decapsulated data unit to a third network device that is included in the first layer-two network.

10. The apparatus of claim 9, wherein the first network device is configured to be operatively coupled to the third network device via a first fabric port.

11. The apparatus of claim 9, wherein the first network device is configured to decapsulate the encapsulated data unit by removing a VXLAN header that was previously added by the second network device.

12. The apparatus of claim 9, wherein the encapsulated data unit includes an Internet Protocol (IP) address.

13. The apparatus of claim 9, wherein the VXLAN tunnel was defined in response to an intermediate system (IS)-to-IS Hello message.

14. The apparatus of claim 9, wherein the VXLAN tunnel traverses at least one node in a wide area network.

15. An apparatus, comprising:
a first network device configured to be included in a first layer-two network and configured to be operatively coupled to a second network device that is (1) included in the first layer-two network and in a layer-three network and (2) operatively coupled, via a virtual-extensible-local-area-network (VXLAN) tunnel, to a third network device that is included in a second layer-two network, the second network device including an application specific integrated circuit (ASIC) configured to execute a first application and not a second application, the third network device including an ASIC configured to execute the second application and not the first application, the first network device configured to receive, from the third network device and via the VXLAN tunnel, a broadcast message including a node prefix assigned to each network device from a plurality of network devices included in the second layer-two network, the plurality of network devices including the third network device, the first network device configured to receive, via the VXLAN tunnel, a data unit that was (1) encapsulated by the third network device prior to being layer-three routed between the third network device and the second network device and (2) decapsulated by the second network device.

16. The apparatus of claim 15, wherein the second network device is configured to decapsulate the data unit that was encapsulated to produce the data unit.

17. The apparatus of claim 16, wherein the first network device is configured to receive the data unit from the second network device via layer-two communication.

18. The apparatus of claim 15, wherein the first layer-two network is a local area network.

19. The apparatus of claim 15, wherein the data unit that was encapsulated includes a VXLAN header that includes an Internet Protocol (IP) address.

* * * * *